US012578458B2

(12) United States Patent (10) Patent No.: US 12,578,458 B2
Yamaguchi et al. (45) Date of Patent: Mar. 17, 2026

(54) SIGNAL PROCESSING DEVICE, SIGNAL PROCESSING METHOD, AND RECORDING MEDIUM

(71) Applicant: NEC Corporation, Tokyo (JP)

(72) Inventors: Yuki Yamaguchi, Tokyo (JP); Taichi Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 475 days.

(21) Appl. No.: 18/022,596

(22) PCT Filed: Aug. 31, 2020

(86) PCT No.: PCT/JP2020/032893
§ 371 (c)(1),
(2) Date: Feb. 22, 2023

(87) PCT Pub. No.: WO2022/044326
PCT Pub. Date: Mar. 3, 2022

(65) Prior Publication Data
US 2023/0393265 A1     Dec. 7, 2023

(51) Int. Cl.
*G01S 13/90* (2006.01)
(52) U.S. Cl.
CPC ................................. *G01S 13/9021* (2019.05)
(58) Field of Classification Search
CPC .......................... G01S 13/9004; G01S 13/9021
See application file for complete search history.

(56) References Cited

U.S. PATENT DOCUMENTS

2018/0011187 A1*  1/2018  Katayama ........... G01S 13/9023
2018/0075319 A1   3/2018  Xu et al.

OTHER PUBLICATIONS

JP Office Action for JP Application No. 2022-545257, mailed on Sep. 26, 2023 with English Translation.
Dong et al., "Holographic SAR Tomography 3-D Reconstruction Based on Iterative Adaptive Approach and Generalized Likelihood Ratio Test", IEEE Transactions on Geoscience and Remote Sensing, May 2020, vol. 59, No. 1, pp. 1-11, DOI: 10.1109/TGRS.2020. 2994201.
International Search Report for PCT Application No. PCT/JP2020/ 032893, mailed on Oct. 6, 2020.
Xiao Xiang Zhu et al., "Tomographic SAR Inversion by L1-Norm Regularization—The Compressive Sensing Approach.", IEEE transactions on Geoscience and Remote Sensing 48.10, 2010, pp. 3839-3846.
Gocho, Masanori et al., "Estimation of Number of Signal Sources in Multi-Baseline SAR Image", Proceedings of the 2019 IEICE Communications Society Conference, Sep. 2019, B-2-12, p. 160.
(Continued)

*Primary Examiner* — Timothy A Brainard
(74) *Attorney, Agent, or Firm* — Sughrue Mion, PLLC

(57) ABSTRACT

A signal processing device sets the value of a hyperparameter for array signal processing in synthetic aperture radar tomography, by using a SAR image group of a phase reference point at which phase reference point known information, which is information pertaining to the position of a reflector, is obtained; and performs SAR image group generation processing, using the array signal processing in which the value of the hyperparameter was used.

7 Claims, 16 Drawing Sheets

(56)  References Cited

OTHER PUBLICATIONS

Batu,Ozge et al., "Hyper-parameter Selection in Advanced Synthetic Aperture Radar Imaging Algorithms", 2008 IEEE 16th Signal Processing, Communication and Applications Conference, 2008, DOI: 10.1109/SIU.2008.4632659.

Xing, Shi-qi et al., "Three-Dimensional Reconstruction of Man-Made Objects Using Polarimetric Tomographic SAR", IEEE Transactions on Geoscience and Remote Sensing, Jun. 2013 vol. 51, No. 6, pp. 3694-3705, DOI: 10.1109/TGRS.2012.2220145.

* cited by examiner

FIG. 2

SIGNAL PROCESSING DEVICE, SIGNAL PROCESSING METHOD, AND RECORDING MEDIUM

This application is a National Stage Entry of PCT/JP2020/032893 filed on Aug. 31, 2020, the contents of all of which are incorporated herein by reference, in their entirety.

TECHNICAL FIELD

The present invention relates to a signal processing device, a signal processing method, and a recording medium.

BACKGROUND ART

Synthetic aperture radar (SAR) is a technique in which an antenna is mounted on a platform such as an aircraft or satellite, and an apparent antenna aperture is synthesized by using the movement of the platform and signal processing techniques, to generate a high-resolution radar image.

The traveling direction of a platform is referred to as azimuth direction, and the line-of-sight direction is referred to as range direction. A direction perpendicular to both the azimuth direction and the range direction is referred to as elevation direction.

Synthetic aperture radar tomography (SAR tomography) is a technique for acquiring three-dimensional information such as ground structures, by extending the concept of a synthetic aperture to an elevation direction. In synthetic aperture radar tomography, a platform repeats movement in the azimuth direction while shifting its position in the elevation direction. In synthetic aperture radar tomography, measurements as in the case of the synthetic aperture radar is repeated at different positions in the elevation direction by repeating movement in the azimuth direction, and a SAR image group is acquired as measurement results. In synthetic aperture tomography, the sensitivity in the elevation direction is realized by performing array signal processing on the obtained SAR image group, using the variation in the position of the platform in the elevation direction as a virtual sensor array.

For example, Non Patent Document 1 discloses an array signal processing method in synthetic aperture radar tomography using compressive sensing.

CITATION LIST

Non Patent Literature

[Non Patent Document 1] Xiao Xiang Zhu, et al., "Tomographic SAR inversion by $L_1$-norm regularization—The compressive sensing approach.", IEEE transactions on Geoscience and Remote Sensing 48.10, 2010, pp. 3839-3846

SUMMARY OF INVENTION

Problems to be Solved by the Invention

When an array signal processing algorithm in synthetic aperture radar tomography has a hyperparameter, if the hyperparameter value can be set automatically, the burden of manually setting the hyperparameter value on the operator of synthetic aperture radar tomography can be reduced.

An example object of the present invention is to provide a signal processing device, a signal processing method, and a recording medium capable of solving the problem mentioned above.

Means for Solving the Problems

According to a first example aspect of the present invention, a signal processing device comprises: a parameter identification means that sets the value of a hyperparameter for array signal processing in synthetic aperture radar tomography, by using a SAR image group of a phase reference point at which phase reference point known information, which is information pertaining to the position of a reflector, is obtained; and a SAR tomography processing means that performs SAR tomography image processing, using the array signal processing in which the value of the hyperparameter set by the parameter identification means was used.

According to a second example aspect of the present invention, a signal processing method comprises: setting the value of a hyperparameter for array signal processing in synthetic aperture radar tomography, by using a SAR image group of a phase reference point at which phase reference point known information, which is information pertaining to the position of a reflector, is obtained; and performing SAR tomography image processing, using the array signal processing in which the set value of the hyperparameter was used.

According to a third example aspect of the present invention, a recording medium stores a program for causing a computer to execute a function of setting the value of a hyperparameter for array signal processing in synthetic aperture radar tomography, by using a SAR image group of a phase reference point at which phase reference point known information, which is information pertaining to the position of a reflector, is obtained; and performing SAR tomography image processing, using the array signal processing in which the set value of the hyperparameter was used.

Advantageous Effects of Invention

According to the signal processing device, the signal processing method, and the recording medium, when an array signal processing algorithm in synthetic aperture radar tomography has a hyperparameter, the hyperparameter value can be set automatically.

EXAMPLE EMBODIMENT

FIG. 2 is a diagram showing an example of platform positions in synthetic aperture radar tomography according to the first example embodiment.

DESCRIPTION OF EMBODIMENTS

Hereinafter, example embodiments of the present invention are described, however, the present invention within the scope of the claims is not limited by the following example embodiments. Furthermore, not all the combinations of features described in the example embodiments are essential for the solving means of the invention.

First Example Embodiment

Description of Configuration

Figure 1:
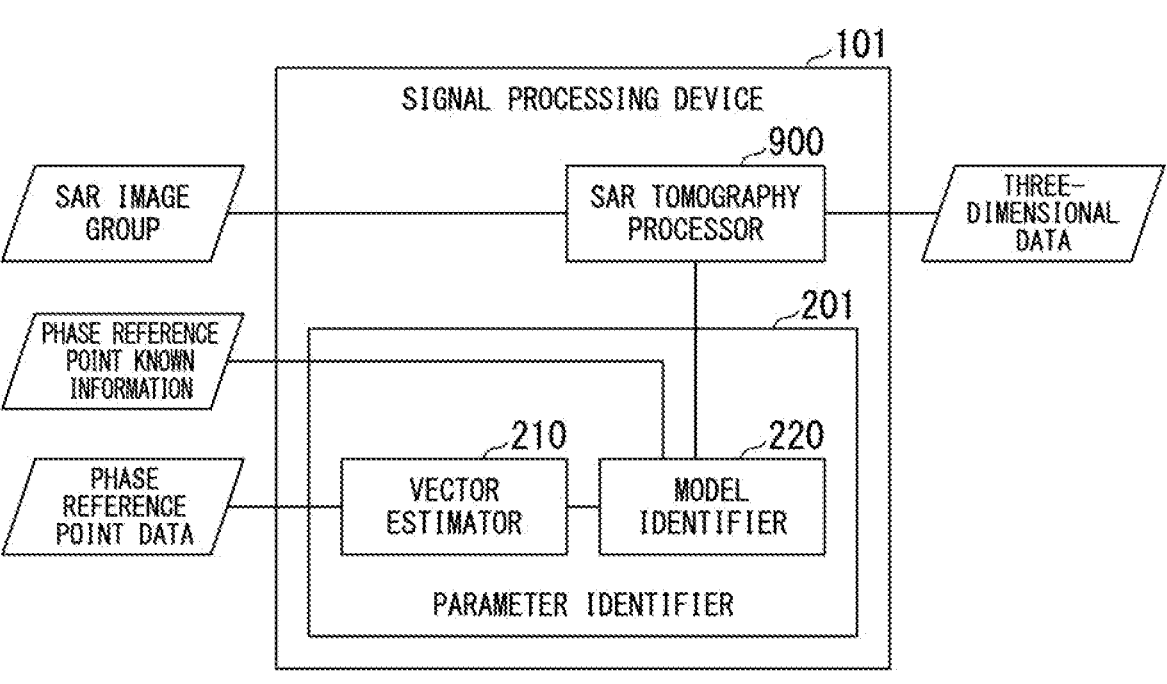
FIG. 1 is a block diagram showing a configuration example of a signal processing device according to a first example embodiment.

FIG. 1 is a block diagram showing a configuration example of a signal processing device according to a first example embodiment. In the configuration shown in FIG. 1, a signal processing device 101 includes a parameter identifier 201 and a SAR tomography processor 900. The parameter identifier 201 includes a vector estimator 210 and a model identifier 220.

The signal processing device 101 calculates three-dimensional data of a reflector, based on a SAR image group obtained as reception signals in synthetic aperture radar tomography. The reflector referred to here is an object that reflects radar, and is treated as a position estimation target in synthetic aperture radar tomography.

The signal processing device 101 is configured using a computer such as a workstation computer or a personal computer. The signal processing device 101 may be configured as one device, or may be configured as a combination of a plurality of devices.

The SAR tomography processor 900 applies array signal processing to received signals (SAR image group) in synthetic aperture radar tomography to calculate and output three-dimensional data. The SAR tomography processor 900 corresponds to an example of the SAR tomography processing means. Calculation of three-dimensional data performed by the SAR tomography processor 900 corresponds to an example of the SAR tomography image processing.

The array signal processing referred to here is processing for array signals observed using a sensor array. In synthetic aperture radar tomography, a SAR image group obtained by repeating radar measurements while a platform equipped with radar moves is treated as array signals, and array signal processing is applied thereto. Synthetic aperture radar tomography provides three-dimensional position information or shape information of reflectors reflecting radar.

Figure 2:
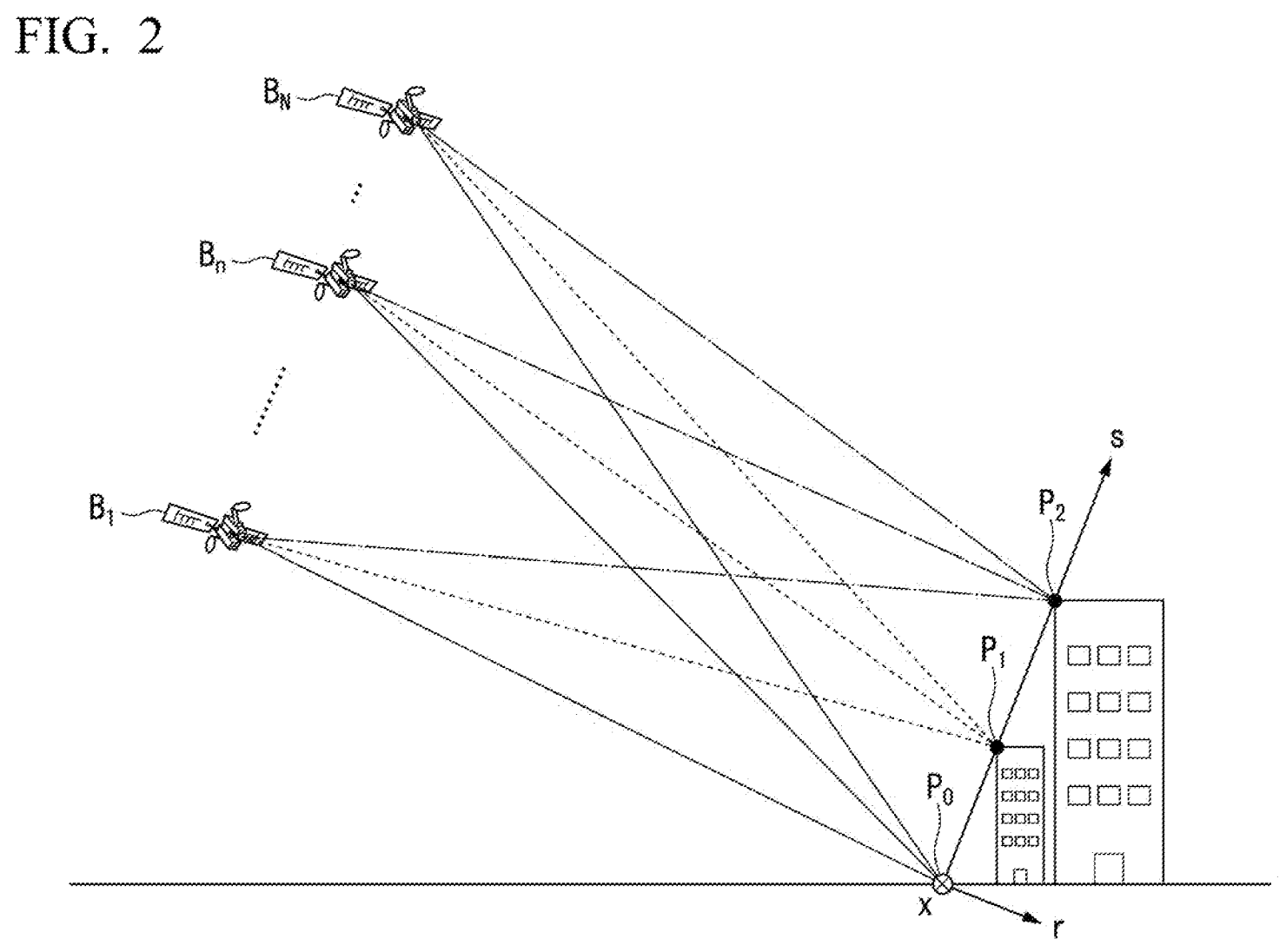

FIG. 2 is a diagram showing an example of platform positions in synthetic aperture radar tomography. The SAR tomography processor 900 calculates three-dimensional data, using data obtained by the measurements exemplified in FIG. 2. The parameter identifier 201 sets the value of the hyperparameter used in the array signal processing performed by the SAR tomography processor 900.

In the example of FIG. 2, the x-axis indicates an azimuth direction. The x-axis is provided in the direction from the near side to the far side of FIG. 2. The r-axis indicates a range direction. The s-axis indicates an elevation direction.

FIG. 2 shows the position $B_n$ (n is an integer where $1 \leq n \leq N$) as an example of the position of the platform. N is a positive integer indicating the measurement frequency. As exemplified in FIG. 2, the platform repeats its movement in the azimuth direction while shifting its position in the elevation direction.

In radar measurements, the platform emits radar toward the range direction and receives reflected waves. In FIG. 2, positions $P_0$, $P_1$, and $P_2$ are shown as examples of reflector positions. The platform receives reflected waves from each of these reflectors. The reception signals (SAR image group)

in synthetic aperture radar tomography are modeled as shown in Equation (1).

[Equation 1]

$$g_n = \int \gamma(s) \exp\left(-\frac{4j\pi b_n s}{\lambda r_0}\right) ds \qquad (1)$$

$g_n$ indicates the signal from the n-th measurement. $b_n$ indicates the baseline length in the n-th measurement. $\gamma$ indicates the reflectivity distribution in the elevation direction. s indicates the coordinate in the elevation direction, as with the case of FIG. 2. $\lambda$ indicates the measurement wavelength. $r_0$ indicates the distance from the platform to the reflector. j indicates the imaginary unit. $\pi$ indicates the circular constant.

Discretizing Equation (1) into L grids in the elevation direction yields Equation (2).

[Equation 2]

$$g_n = \sum_{i=1}^{L} \gamma(s_i) \exp\left(-\frac{4j\pi b_n s_i}{\lambda r_0}\right) \qquad (2)$$

$s_i$ indicates the coordinates in the i-th grid among the grids divided in the elevation direction. Vectorizing Equation (2) and aggregating the data of N measurements yields Equation (3).

[Equation 3]

$$g = R\gamma \qquad (3)$$

The vector g is a column vector of length N indicating a measurement value. The vector g is represented as $g=[g_1, g_2, \ldots, g_n]^T$. The superscript "T" represents the transposition of a vector or a matrix.

The vector $\gamma$ is a column vector of a length L that indicates a reflectivity distribution vector in the elevation direction. The vector $\gamma$ is represented as $\gamma=[\gamma_1, \gamma_2, \ldots, \gamma_L]^T$. The reflectivity distribution vector referred to here is a vector indicating the distribution of reflector reflectance estimated at the location of each of the grids divided into L grids in the elevation direction.

The matrix R of Equation (3) is a matrix map of size N×L. A component $r_{nl}$ of the matrix R is represented as Equation (4).

[Equation 4]

$$r_{nl} = \exp\left(-\frac{4j\pi b_n s_l}{\lambda r_0}\right) \qquad (4)$$

The SAR tomography processor 900 solves Equation (3) for the vector $\gamma$ for each pixel in the array signal processing in synthetic aperture radar tomography, and thereby estimates at which positions in the elevation direction reflectors exist. Specifically, the SAR tomography processor 900 finds the reflectivity distribution vector $\gamma$ in the elevation direction by the array signal processing.

However, the direction in which the SAR tomography processor 900 finds the reflectivity distribution is not limited to the elevation direction, and may be various directions. For example, "$r_0$" in Equation (2) mentioned above can be substituted by "$r_0 \sin\theta$". The $\theta$ in this case indicates the angle of the direction in which the SAR tomography processor 900 finds the reflectivity distribution vector $\gamma$, relative to the planes in the azimuth direction and the range direction.

When $\theta$ is 90 degrees, the SAR tomography processor 900 finds the reflectivity distribution vector $\gamma$ in the elevation direction. On the other hand, when $\theta$ is the radar incident angle, that is, when $\theta$ is the angle formed between the normal to the ground surface and the line-of-sight direction (range direction) of the radar, the SAR tomography processor 900 finds the reflectivity distribution vector $\gamma$ in the direction perpendicular to the ground surface.

Various known methods can be used as methods that the SAR tomography processor 900 uses for the array signal processing in synthetic aperture radar tomography. For example, the SAR tomography processor 900 may use beamforming or MUSIC (Multiple Signal Classification) to perform the array signal processing, however, the method is not limited to these examples.

The parameter identifier 201 sets the value of the hyperparameter in the method used in the array signal processing performed in synthetic aperture radar tomography by the SAR tomography processor 900. The meaning of the hyperparameter referred to here differs depending on the array signal processing method. For example, when the SAR tomography processor 900 uses MUSIC, the number of reflectors included in one pixel is set as a hyperparameter value. On the other hand, when the SAR tomography processor 900 uses compressive sensing, the regularization parameter indicating the degree of influence of the regularization term on the loss function corresponds to a hyperparameter.

The parameter identifier 201 receives input of phase reference point data and phase reference point known information, and identifies and outputs an appropriate hyperparameter value.

The phase reference point referred to here is a pixel where a reflector is stably observed. The pixel referred to here is one section obtained by dividing the coordinates in the azimuth direction and the range direction into the azimuth direction and the range direction, respectively.

The SAR tomography processor 900 performs the array signal processing for each pixel, and finds, for example, the reflectivity distribution vector $\gamma$ in the elevation direction for each pixel. The SAR tomography processor 900 then calculates three-dimensional data of the reflector in the three-dimensional space, based on the reflectivity distribution vector $\gamma$ for each pixel.

The phase reference point data is measurement data of phase reference points in a SAR image group obtained as measurement results in SAR tomography. The phase reference point known information is known information indicating the positions and number of reflectors at the phase reference point, such as the altitude of the reflector at the phase reference point. The parameter identifier 201 evaluates hyperparameter values using phase reference point data for which phase reference point known information is obtained, and identifies appropriate hyperparameter values. The parameter identifier 201 may use phase reference point data and phase reference point known information at one phase reference point. Alternatively, the parameter identifier 201 may use phase reference point data and phase reference point known information at a plurality of phase reference points.

As the phase reference point known information, information in the same direction as the direction in which the SAR tomography processor 900 obtains the reflectivity distribution vector $\gamma$ is used. For example, when the SAR tomography processor 900 obtains the reflectivity distribution vector γ in the direction perpendicular to the ground surface, information pertaining to the direction perpendicular to the ground surface, such as information indicating the height and number of reflectors, is used as the phase reference point known information.

The appropriate hyperparameter value referred to here is a hyperparameter value that, when used in array signal processing, enables calculation of three-dimensional data indicating the actual positions of the reflectors, based on received signals (SAR image group) in synthetic aperture radar tomography.

Specifically, the parameter identifier 201 applies the array signal processing that uses hyperparameter values to the phase reference point data in which the positions of the reflectors is indicated by the phase reference point known information. Then, when the positions and number of reflectors calculated from the array signal processing result and the positions and number of reflectors indicated by the phase reference point known information are closer than a predetermined condition, the parameter identifier 201 treats the used hyperparameter value as a proper hyperparameter value.

The parameter identifier 201 corresponds to an example of the parameter identification means.

The vector estimator 210 uses inputs of the phase reference point data and the determination result from the model identifier 220 to perform array signal processing at the phase reference point and calculate the reflectivity distribution vector γ at the phase reference point. The reflectivity distribution vector γ at the phase reference point calculated by the vector estimator 210 is also referred to as a reflectivity distribution vector estimation result or simply a vector estimation result.

The vector estimator 210 finds the reflectivity distribution vector γ in the same direction as that in the case of the SAR tomography processor 900. As described above regarding the SAR tomography processor 900, the direction in which the vector estimator 210 finds the reflectivity distribution vector γ is not limited to the elevation direction and can be various directions. For example, the vector estimator 210 may find the reflectivity distribution vector γ in the direction perpendicular to the ground surface.

The direction in which the vector estimator 210 finds the reflectivity distribution vector γ is also referred to as the reflectivity distribution estimation direction.

Figure 3:
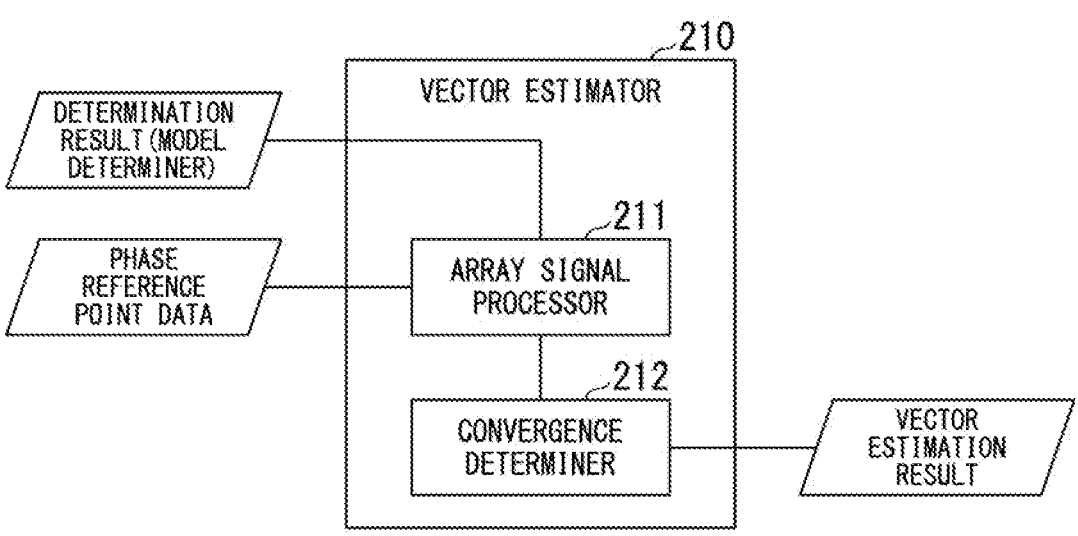
FIG. 3 is a block diagram showing a configuration example of a vector estimator according to the first example embodiment.

FIG. 3 is a block diagram showing a configuration example of the vector estimator 210. In the configuration shown in FIG. 3, the vector estimator 210 includes an array signal processor 211 and a convergence determiner 212.

Data can be input and output between the array signal processor 211 and the convergence determiner 212.

The array signal processor 211 uses inputs of phase reference point data and determination result from the model identifier 220 to perform array signal processing at a phase reference point and calculate the reflectivity distribution vector γ at the phase reference point.

The array signal processor 211 calculates the reflectivity distribution vector γ in the same direction as that in the case of the vector estimator 210. As described below, the reflectivity distribution vector γ calculated by the array signal processor 211 is also used as a reflectivity distribution vector γ output by the vector estimator 210.

The array signal processing performed by the array signal processor 211 at a phase reference point is also referred to as signal estimation. The reflectivity distribution vector γ calculated by the array signal processor 211 at a phase reference point is also referred to as a signal estimation result.

The array signal processor 211 outputs the signal estimation result to the convergence determiner 212.

The vector estimation result output by the vector estimator 210 is the signal estimation result obtained when the convergence determiner 212 determines that the signal estimation result has converged, among the signal estimation results output by the array signal processor 211.

The array signal processor 211 repeats the signal estimation process using the new hyperparameter value until the convergence determination result from the convergence determiner 212 indicates that the signal estimation result has converged. Furthermore, the array signal processor 211 repeats the signal estimation process using the new hyperparameter value until the determination result from the model identifier 220 indicates that the estimated positions and number of reflectors match the positions and number of reflectors obtained from the phase reference point known information.

The convergence determiner 212 uses an input of the signal estimation result from the array signal processor 211 and determines whether the signal estimation result has converged. If the signal estimation result is determined as having converged, the convergence determiner 212 outputs a convergence determination result indicating a convergence to the array signal processor 211. Moreover, if the signal estimation result is determined as having converged, the convergence determiner 212 outputs the signal estimation result at that time to the model identifier 220 as a vector estimation result.

On the other hand, if the signal estimation result is determined as not having converged, the convergence determiner 212 outputs a convergence determination result indicating a non-convergence to the array signal processor 211. In such a case, the vector estimator 210 does not output a vector estimation result.

The convergence determiner 212 determines a convergence by counting the number of non-zero components in the signal estimation result from the array signal processor 211. For example, if the number of non-zero components is less than one tenth of the length of the estimated signal, the convergence determiner 212 determines that the signal estimation result has converged.

The length of the estimated signal referred to here is the number of elements of the reflectivity distribution vector γ as an estimated signal. A non-zero component is an element whose value is not 0 among the elements of the reflectivity distribution vector γ as an estimated signal. Therefore, the condition that the number of non-zero components is less than one tenth of the length of the estimated signal means that, among the elements of the reflectivity distribution vector γ as the estimated signal, the number of elements whose value is not 0 is one tenth of the total number of elements or less.

However, the method by which the convergence determiner 212 determines the convergence of the signal estimation result is not limited to this method. As a method for determining the convergence of the signal estimation result, the convergence determiner 212 may use various methods that enable evaluation of the accuracy with which the signal estimation result indicates the three-dimensional positions of reflectors.

The model identifier 220 identifies the positions and the number of reflectors existing in the reflectivity distribution estimation direction at the phase reference point, based on the vector estimation result, and compares them with the phase reference point known information. The model identified by the model identifier 220 that indicates the positions and the number of reflectors existing in the reflectivity distribution estimation direction at the phase reference point, is also referred to as a reflector position model in the reflectivity distribution estimation direction.

The model identifier 220 determines, based on the above comparison, whether the phase reference point known information matches the reflector position model in the reflectivity distribution estimation direction. The phase reference point known information and the reflector position model in the reflectivity distribution estimation direction matching with each other means that the positions and number of reflectors obtained from the phase reference point known information match the positions and number of the reflectors obtained from the reflector position model in the reflectivity distribution estimation direction. The term "match" here is not limited to meaning a perfect match, and may mean approximation to a predetermined condition or more.

If it is determined that the phase reference point known information and the reflector position model in the reflectivity distribution estimation direction match, the model identifier 220 outputs the hyperparameter value at that time to the SAR tomography processor 900, and outputs the determination result indicating a match to the vector estimator 210.

On the other hand, if it is determined that the phase reference point known information and the reflector position model in the reflectivity distribution estimation direction do not match, the model identifier 220 outputs the determination result indicating non-match to the vector estimator 210. In such a case, the model identifier 220 does not output a hyperparameter value.

Figure 4:
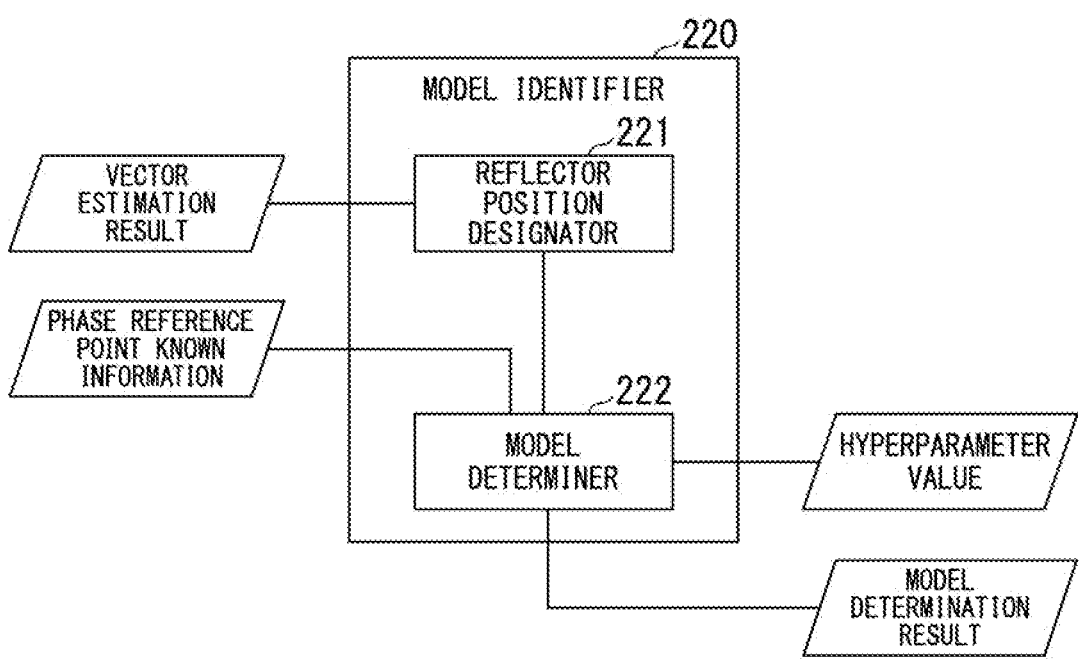
FIG. 4 is a block diagram showing a configuration example of a model identifier according to the first example embodiment.

FIG. 4 is a block diagram showing a configuration example of the model identifier 220. In the configuration shown in FIG. 4, the model identifier 220 includes a reflector position designator 221 and a model identifier 222. This configuration enables data input and data output between the reflector position designator 221 and the model determiner 222.

The reflector position designator 221 uses an input of the vector estimation result from the vector estimator 210 to designate and output reflector positions (positions of reflector) in the reflectivity distribution estimation direction.

Specifically, the reflector position designator 221 determines the specific reflector positions, based on the reflector position in the reflectivity distribution estimation direction, which is indicated as a distribution by the reflectivity distribution vector, as the vector estimation result. For example, the reflector position designator 221 designates, as reflector positions, the positions where the absolute value of the value indicating the distribution in the vector estimation result is equal to or greater than a predetermined threshold value and where the absolute value is maximum.

Then, the reflector position designator 221 aggregates a plurality of positions determined to be close into one position, based on a predetermined conversion rule. As a result of the process of aggregating a plurality of positions into one position, the number of reflectors is determined.

The model determiner 222 determines whether the reflector positions in the reflectivity distribution estimation direction designated by the reflector position designator 221 reproduce the phase reference point known information. Specifically, the model determiner 222 uses an input of the phase reference point known information and the reflector positions designated by the reflector position designator 221, to determine whether the designated reflector positions match the reflector positions obtained from the phase reference point known information. As described above, the term "match" here may mean approximation to a predetermined condition or more.

If the phase reference point known information matches the reflector position model in the reflectivity distribution estimation direction, the model determiner 222 outputs the hyperparameter value at that time to the SAR tomography processor 900 as an identified appropriate hyperparameter value. The model determiner 222 also outputs the determination result indicating matching to the vector estimator 210.

On the other hand, if it is determined that the phase reference point known information and the reflector position model in the reflectivity distribution estimation direction do not match, the model determiner 222 outputs the determination result indicating non-match to the vector estimator 210. In such a case, the model determiner 222 does not output a hyperparameter value.

If the model determiner 222 determines that the phase reference point known information and the reflector position model in the elevation direction do not match, vector estimation by the vector estimator 210 and determination by the model determiner 222 are repeated, using a new hyperparameter value.

Specifically, the vector estimator 210 updates the hyperparameter value and performs vector estimation using a new hyperparameter value. Then, the model determiner 222 determines whether the phase reference point known information and the reflector position model in the elevation direction match with the vector estimation result based on the new hyperparameter value.

Instead of the vector estimator 210, the array signal processor 211 or the parameter identifier 201 may update the hyperparameter value.

It can be said that the determination performed by the model determiner 222 compares the reflector positions designated by the reflector position designator 221 with the reflector positions obtained from the phase reference point known information, to evaluate the validity of the designated reflector positions.

Description of Operation

Next, operations of the signal processing device 101 will be described.

Figure 5:
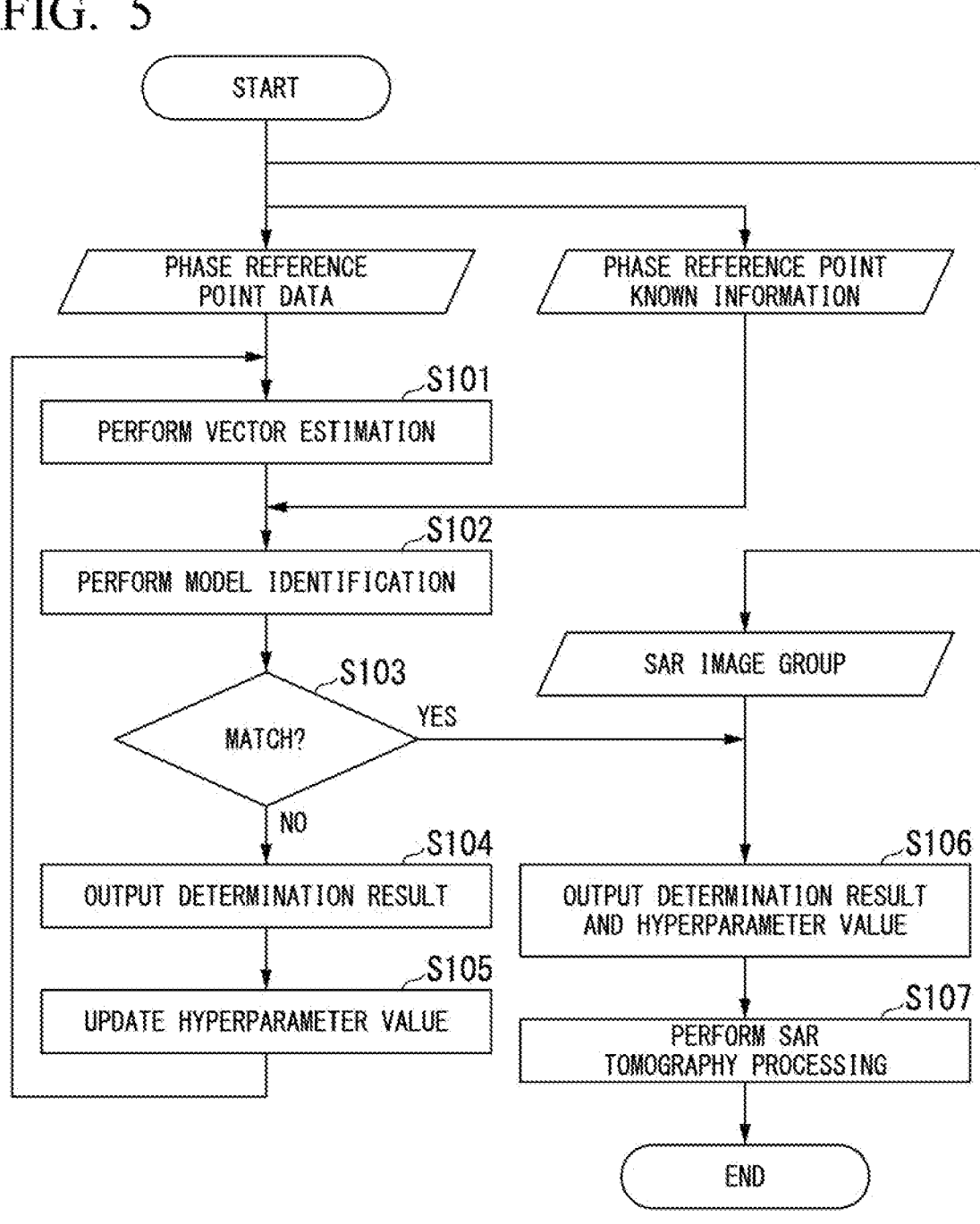
FIG. 5 is a flowchart showing an example of a procedure for the signal processing device according to the first example embodiment to perform SAR tomography three-dimensional image processing.

FIG. 5 is a flowchart showing an example of a procedure for the signal processing device 101 to perform SAR tomography three-dimensional image processing.

In the process of FIG. 5, the vector estimator 210 receives an input of phase reference point data and estimates a reflectivity distribution vector at a phase reference point (Step S101).

Figure 6:
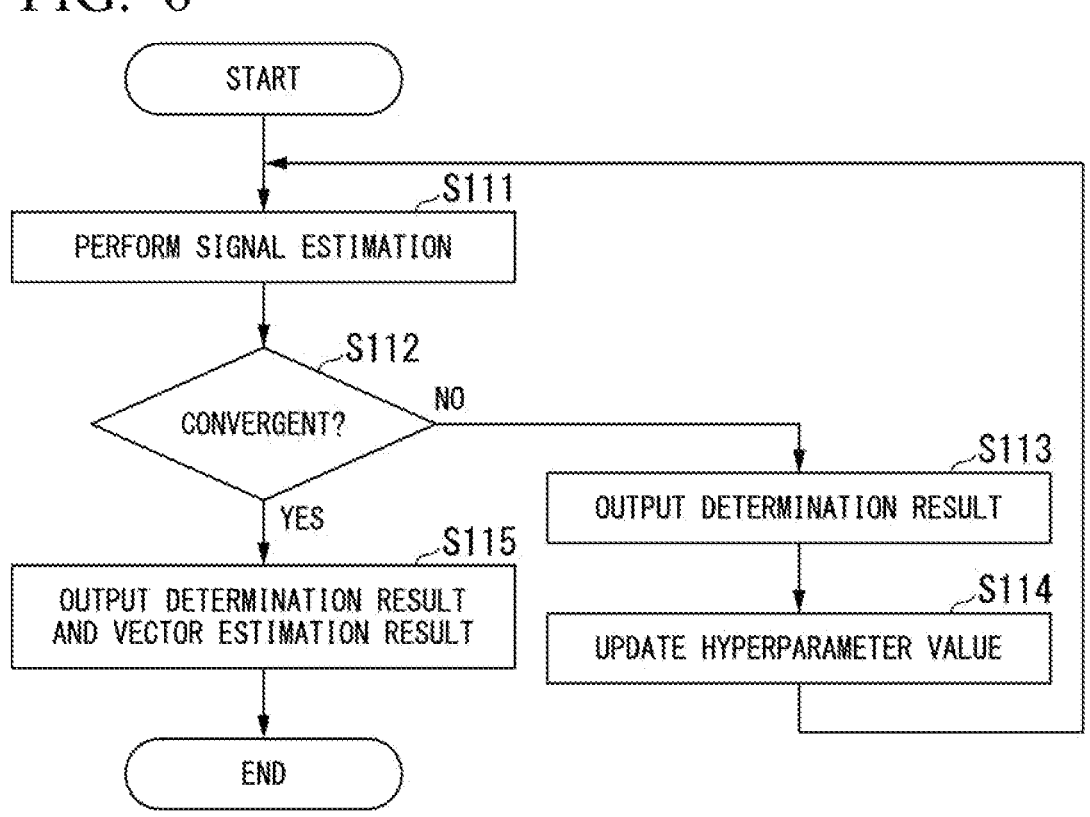
FIG. 6 is a flowchart showing an example of a processing procedure for the vector estimator according to the first example embodiment to estimate a reflectivity distribution vector in an elevation direction at a phase reference point.

FIG. 6 is a flowchart showing an example of a processing procedure for the vector estimator 210 to estimate a reflectivity distribution vector at a phase reference point. The vector estimator 210 performs the process of FIG. 6 in Step S101 of FIG. 5.

In the process of FIG. 6, the array signal processor 211 performs array signal processing at the phase reference point using the set hyperparameter value and the phase reference point data, and outputs the reflectivity distribution vector $\gamma$ as a signal estimation result to the convergence determiner 212 (Step S111).

The initial value of the hyperparameter that the array signal processor 211 uses when Step S111 is executed for the first time may be set preliminarily. Alternatively, the array signal processor 211 may input a predetermined initial value to the hyperparameter. Instead of the array signal processor 211, the vector estimator 210 or the parameter identifier 201 may input a predetermined initial value to the hyperparameter.

The convergence determiner 212 determines whether the signal estimation result has converged (Step S112).

If determined as not having converged (Step S112: NO), the convergence determiner 212 outputs a convergence determination result indicating a non-convergence to the array signal processor 211 (Step S113).

The array signal processor 211 updates the hyperparameter value according to the determination result from the convergence determiner 212 (Step S114). Instead of the array signal processor 211, the vector estimator 210 or the parameter identifier 201 may update the hyperparameter value.

After Step S114, the process transitions to Step S111. In such a case, the array signal processor 211 repeats the signal estimation process in Step S111 using the new hyperparameter value until the convergence determiner 212 determines that the signal estimation result has converged.

On the other hand, if the signal estimation result is determined as having converged (Step S112: YES), the convergence determiner 212 outputs a convergence determination result indicating a convergence to the array signal processor 211, and outputs a vector estimation result to the model identifier 220 (Step S115).

After Step S115, the vector estimator 210 ends the process of FIG. 6. In such a case, the process transitions from Step S101 to Step S102 of FIG. 5.

After Step S101 of FIG. 5, the model identifier 220 uses an input of the vector estimation result estimated by the vector estimator 210 and the phase reference point known information to identify the reflector position model in the reflectivity distribution estimation direction (Step S102).

Specifically, upon receiving the vector estimation result from the vector estimator 210, the reflector position designator 221 designates the reflector positions and outputs the designation result to the model determiner 222. For example, the reflector position designator 221 may designate, as reflector positions, the positions where the absolute value is extremely high or maximum in the vector estimation result.

Next, the model identifier 220 determines whether the reflector positions designated by the reflector position designator 221 match the reflector positions indicated by the phase reference point known information (Step S103).

Specifically, the model determiner 222 uses an input of the reflector positions designated by the reflector position designator 221 and the phase reference point known information, to determine whether the designated reflector positions designated by the reflector position designator 221 match the reflector positions indicated by the phase reference point known information. This determination can be seen as determining whether the reflector positions designated by the reflector position designator 221 reproduce the phase reference point known information.

If the reflector positions are determined as not matching (Step S103: NO), the model determiner 222 outputs the determination result indicating a non-match to the vector estimator 210 (Step S104). Upon receiving the determination result from the model determiner 222, the array signal processor 211, the vector estimator 210, or the parameter identifier 201 may update the hyperparameter value (Step S105).

After Step S105, the process transitions to Step S101. In such a case, the vector estimator 210 repeats the signal estimation process in Step S101 using the new hyperparameter value until the model determiner 222 determines that the reflector positions match.

On the other hand, if the reflector positions are determined as matching (Step S103: YES), the model determiner 222 outputs the determination result to the vector estimator 210, and outputs an identified appropriate hyperparameter value to the SAR tomography processor 900 (Step S106).

The SAR tomography processor 900 uses an input of the appropriate hyperparameter value from the model determiner 222 and a SAR image group that has undergone interferometric processing, to perform array signal processing for each pixel, and outputs three-dimensional data obtained by SAR tomography (Step S107).

After Step S107, the signal processing device 101 ends the process of FIG. 5.

Description of Effect

As described above, the parameter identifier 201 sets the value of a hyperparameter for array signal processing in synthetic aperture radar tomography, by using a SAR image group of a phase reference point at which phase reference point known information, which is information pertaining to reflector positions, is obtained. The SAR tomography processor 900 performs SAR tomography image processing, using the array signal processing in which the value of the hyperparameter set by the parameter identifier 201 was used.

According to the signal processing device 101, when an array signal processing algorithm in synthetic aperture radar tomography has a hyperparameter, the hyperparameter value can be set automatically.

In particular, in the signal processing device 101, it is possible, by means of the parameter identifier 201, to estimate a hyperparameter that enables reproduction of phase reference point known information, that is, an appropriate hyperparameter. An appropriate hyperparameter at a phase reference point is also expected to be an appropriate hyperparameter for other pixels.

In this respect, the signal processing device 101 is expected to be able to converge the result of array signal processing in the SAR tomography processor 900 to a globally optimum solution.

Here, in those cases where the hyperparameter value needs to be adjusted artificially, it is conceivable that if the value is set inappropriately, the result of reflectivity distribution vector estimation may not converge and the original reflectivity distribution may not be reproduced at all. Also, if an inappropriate hyperparameter value is set, convergence may occur to a local solution, which is not the global optimum solution, and a false signal may be detected at a position different from the original reflectivity distribution. Further, it is conceivable that if an inappropriate hyperparameter value is set, a large computational cost may be required until convergence to an appropriate solution is achieved.

In contrast to this, the parameter identifier 201 evaluates the validity of a meta-parameter value using phase reference point known information, and sets a meta-parameter value evaluated as valid. In this respect, as described above, the signal processing device 101 is expected to be able to converge the result of array signal processing in the SAR tomography processor 900 to a globally optimum solution.

Moreover, the vector estimator 210 estimates a reflectivity distribution vector indicating a distribution of estimated positions of the reflectors in a reflectivity distribution estimation direction at a phase reference point, based on phase reference point data obtained from reception signals at the phase reference point. The model identifier 220 identifies a reflector position model indicating the positions and number of the reflectors at a phase reference point, based on phase reference point known information and a reflectivity distribution vector estimated by the vector estimation device 210.

In this way, the model identifier 220 identifies a reflector position model that indicates the positions and number of reflectors at a phase reference point, thereby enabling the vector estimator 210 to evaluate the validity of a hyperparameter value used in reflectivity distribution vector estimation.

Moreover, the reflector position designator 221 designates the positions of reflectors in a reflectivity distribution estimation direction, based on the reflectivity distribution vector estimated by the vector estimator 210. The model determiner 222 evaluates the validity of the designated reflector positions by comparing designated reflector positions with reflector positions obtained from phase reference point known information.

In this way, the reflector position designator 221 designates specific positions of reflectors, based on a reflectivity distribution vector indicating a distribution of reflector positions, thereby enabling the model determiner 222 to evaluate the validity of a hyperparameter value by comparing designated reflector positions with reflector positions obtained from phase reference point known information.

Second Example Embodiment

Description of Configuration

Figure 7:
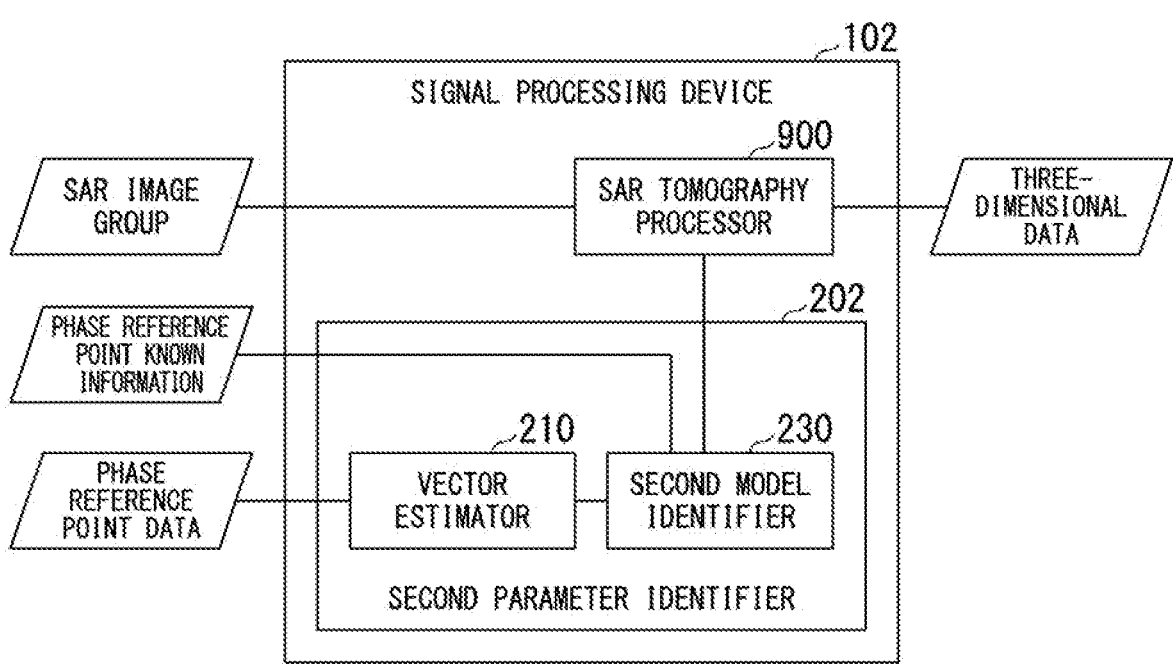
FIG. 7 is a block diagram showing a configuration example of a signal processing device according to a second example embodiment.

FIG. 7 is a block diagram showing a configuration example of a signal processing device according to a second example embodiment. In the configuration shown in FIG. 7, a signal processing device 102 includes a second parameter identifier 202 and the SAR tomography processor 900. The second parameter identifier 202 includes the vector estimator 210 and a second model identifier 230.

Since the vector estimator 210 and the SAR tomography processor 900 in FIG. 7 are the same as the vector estimator 210 and the SAR tomography processor 900 in FIG. 1, the same reference signs are assigned thereto and detailed descriptions thereof are omitted. Comparing the signal processing device 102 with the signal processing device 101 shown in FIG. 1, the parameter identifier 201 is substituted by the second parameter identifier 202. Comparing the second parameter identifier 202 with the parameter identifier 201 in FIG. 1, the model identifier 220 is substituted by the second model identifier 230.

In other respects, the signal processing device 102 is the same as the signal processing device 101.

The second parameter identifier 202 receives an input of phase reference point data and phase reference point known information, and outputs an identified appropriate hyperparameter to the SAR tomography processor 900.

The second model identifier 230 identifies a reflector position model in a reflectivity distribution estimation direction from a vector estimation result, and compares it with phase reference point known information. If it is determined that the phase reference point known information and the reflector position model in the reflectivity distribution estimation direction match, the second model identifier 230 outputs the hyperparameter value to the SAR tomography processor 900, and outputs the determination result to the vector estimator 210.

On the other hand, if it is determined that the phase reference point known information and the reflector position model in the reflectivity distribution estimation direction do not match, the second model identifier 230 outputs the determination result to the vector estimator 210. In such a case, the second model identifier 230 does not output a hyperparameter value.

Figure 8:
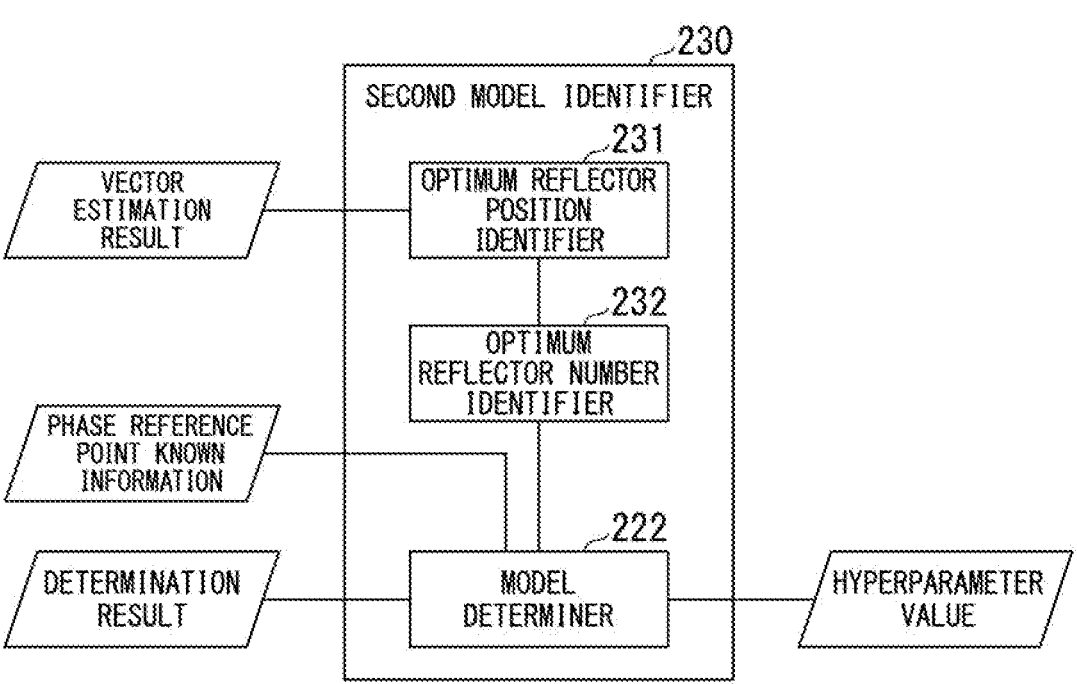
FIG. 8 is a block diagram showing a configuration example of a second model identifier according to the second example embodiment.

FIG. 8 is a block diagram showing a configuration example of the second model identifier 230. In the configuration shown in FIG. 8, the second model identifier 230 includes an optimum reflector position identifier 231, an optimum reflector number identifier 232, and the model identifier 222.

Since the model determiner 222 in FIG. 8 is the same as the model determiner 222 in FIG. 4, the same reference sign is assigned thereto and detailed description thereof is omitted.

Comparing the second model identifier 230 with the model identifier 220 in FIG. 4, the reflector position designator 221 is substituted by the optimum reflector position identifier 231 and the optimum reflector number identifier 232.

In other respects, the second model identifier 230 is the same as the model identifier 220.

The optimum reflector position identifier 231 uses an input of a vector estimation result to identify optimum reflector positions.

The optimum reflector positions referred to here are reflector positions where the highest evaluation is observed using an evaluation function. Alternatively, optimum reflector positions may be reflector positions where a high evaluation equal to or higher than a predetermined condition is observed using an evaluation function.

As the evaluation function, for example, a log-likelihood function with a penalty term that prevents underestimation of an evaluation function and avoids overfitting can be used. In such a case, the smaller the evaluation function value, the higher the evaluation. Therefore, the optimum reflector position identifier 231 may identify reflector positions where the evaluation function value is the smallest as optimum reflector positions.

The optimum reflector number identifier 232 uses an input of the optimum reflector positions output from the optimum reflector position identifier 231 to identify the optimum reflector number (the number of reflectors).

The optimum reflector number referred to here is the number of reflectors with which the highest evaluation is observed using an evaluation function. Alternatively, the optimum reflector number may be the number of reflectors with which a high evaluation equal to or higher than a predetermined condition is observed using an evaluation function.

As the evaluation function, for example, a log-likelihood function with a penalty term can be used. In such a case, the optimum reflector position identifier 232 identifies the optimum number of reflectors that makes the evaluation function value the smallest as the optimum reflector number.

Description of Operation

Next, operations of the signal processing device 102 will be described.

Figure 9:
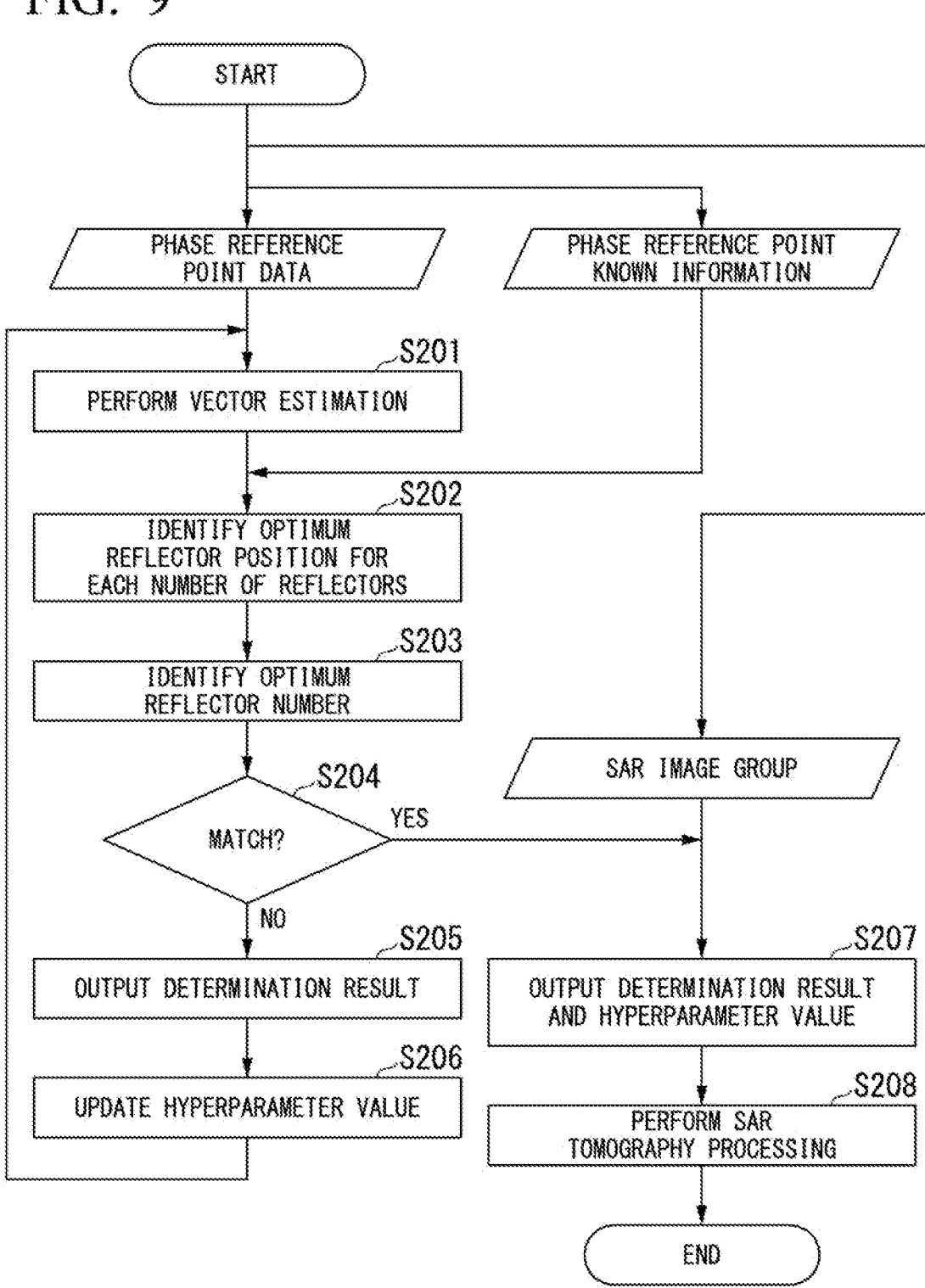
FIG. 9 is a flowchart showing an example of a procedure for the signal processing device according to the second example embodiment to perform SAR tomography three-dimensional image processing.

FIG. 9 is a flowchart showing an example of a procedure for the signal processing device 102 to perform SAR tomography three-dimensional image processing.

Step S201 of FIG. 9 is the same as Step S101 of FIG. 5.

After Step S201, the optimum reflector position identifier 231 identifies optimum reflector positions for each assumption of the reflector number (Step S202).

Figure 10:
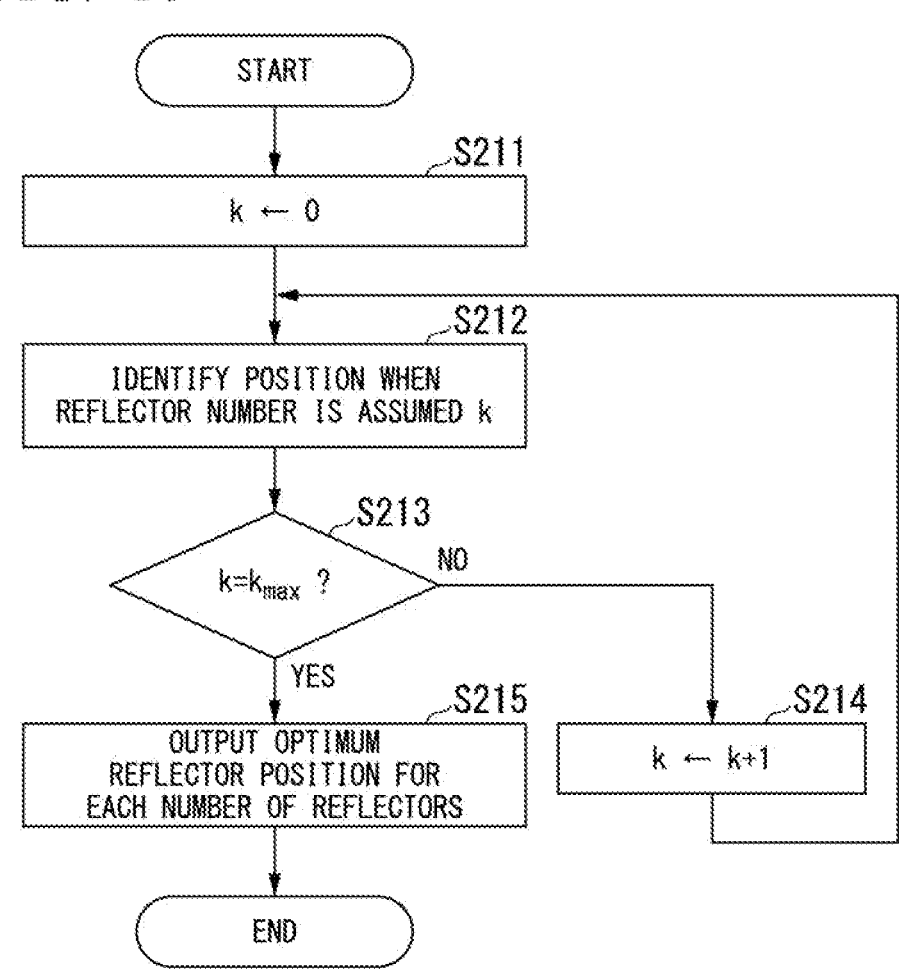
FIG. 10 is a flowchart showing an example of a processing procedure for an optimum reflector position identifier according to the second example embodiment to identify optimum reflector positions for each assumption of the number of reflectors.

FIG. 10 is a flowchart showing an example of a processing procedure for an optimum reflector position identifier 231 to identify optimum reflector positions for each assumption of the number of reflectors. The optimum reflector position identifier 231 performs the process of FIG. 10 in Step S202 of FIG. 9.

In the process of FIG. 10, the optimum reflector position identifier 231 sets the value of the variable k indicating the number of reflectors at a phase reference point to 0 (Step S211). k is an integer satisfying $0 \leq k \leq k_{max}$. $k_{max}$ is a positive integer indicating the maximum value assumed as the number of reflectors included in the pixel of the phase reference point. For example, $k_{max}=3$ may be used, however, the invention is not limited to this example.

Next, the optimum reflector position identifier 231 identifies optimum reflector positions in the case where the number of reflectors is assumed to be k (Step S212). As mentioned above, the optimum reflector position identifier 231 uses an evaluation function to identify optimum reflector positions. For example, the optimum reflector position identifier 231 may use combinatorial optimization to identify optimum reflector positions.

Next, the optimum reflector position identifier 231 determines whether $k=k_{max}$ is true (Step S213). If k is determined as not being $k_{max}$ (Step S213: NO), the optimum reflector position identifier 231 increases the value of k by 1 (Step S214).

After Step S214, the process transitions to Step S212. As a result, in Step S212, the optimum reflector position identifier 231 identifies optimum reflector positions for each of the cases where the number of reflectors is 0, where the number of reflectors is 1, ... where the number of reflectors is $k_{max}$.

On the other hand, if k is determined as being $k_{max}$ (Step S213: YES), the optimum reflector position identifier 231 outputs the optimum reflector positions for the value of each k to the optimum reflector number identifier 232 (Step S215).

After Step S215, the optimum reflector position identifier 231 ends the process of FIG. 10. In such a case, the process transitions from Step S202 to Step S203 of FIG. 9.

After step S202 in FIG. 9, the optimum reflector number identifier 232 identifies the optimum reflector number, based on the optimum reflector positions for each number of reflectors identified by the optimum reflector position identifier 231.

Figure 11:
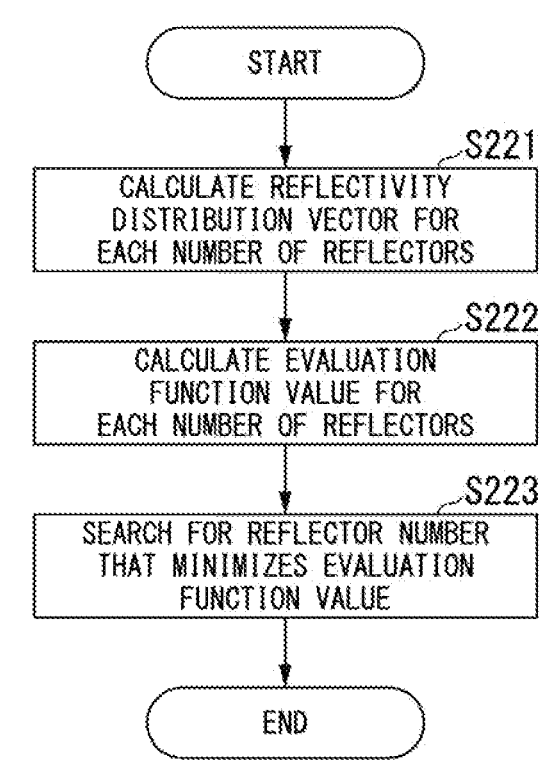
FIG. 11 is a flowchart showing an example of a processing procedure for an optimum reflector number identifier according to the second example embodiment to identify the optimum number of reflectors.

FIG. 11 is a flowchart showing an example of a processing procedure for the optimum reflector number identifier 232 to identify the optimum reflector number. The optimum reflector number identifier 232 performs the process of FIG. 11 in Step S203 of FIG. 9.

In the process of FIG. 11, the optimum reflector number identifier 232 receives an input of optimum reflector positions identified by the optimum reflector position identifier 231 for each k value, and for each k value, calculates a reflectivity distribution vector based on the optimum reflector positions (Step S221).

Next, the optimum reflector number identifier 232, for each k value, calculates an evaluation function value for the calculated reflectivity distribution vector (Step S222). For example, the optimum reflector number identifier 232 uses an evaluation function indicating a vector similarity, and for each k value, calculates an evaluation function value indicating the degree of similarity between the calculated reflectivity distribution vector and the vector estimation result obtained by the vector estimator (Step S222).

Next, the optimum reflector number identifier 232 searches for the number of reflectors with the highest evaluation, and outputs it as an optimum reflector number (Step S223). For example, when the optimum reflector number identifier 232 uses a log-likelihood function with a penalty term as an evaluation function, the number of reflectors with the lowest evaluation function value is identified as the optimum reflector number.

After Step S223, the optimum reflector number identifier 232 ends the process of FIG. 11. In such a case, the process transitions from Step S203 to Step S204 of FIG. 9.

After Step S203 of FIG. 9, the model determiner 222 determines whether the optimum reflector number and the positions of reflectors indicated by the optimum reflector positions match the positions of reflectors obtained from the phase reference point known information (Step S204).

Specifically, the model determiner 222 acquires the optimum reflector positions in the case of the optimum reflector number identified by the optimum reflector position identifier 232, among optimum reflector positions identified for each k value by the optimum reflector position identifier 231. Then, the model determiner 222 determines whether the optimum reflector positions in the case of the optimum reflector number match the reflector positions obtained from the phase reference point known information. As described above, the term "match" here may mean approximation to a predetermined condition or more.

If the reflector positions are determined as not matching (Step S204: NO), the model determiner 222 outputs the determination result indicating a non-match to the vector estimator 210 (Step S205). Upon receiving the determination result from the model determiner 222, the array signal processor 211, the vector estimator 210, or the parameter identifier 201 may update the hyperparameter value (Step S205).

After Step S206, the process transitions to Step S201. In such a case, the vector estimator 210 repeats the signal estimation process in Step S201 using the new hyperparameter value until the model determiner 222 determines that the reflector positions match.

On the other hand, if the reflector positions are determined as matching (Step S204: YES), the model determiner 222 outputs the determination result to the vector estimator 210, and outputs an identified appropriate hyperparameter value to the SAR tomography processor 900 (Step S207).

The SAR tomography processor 900 uses an input of the appropriate hyperparameter value from the model determiner 222 and a SAR image group that has undergone interferometric processing, to perform array signal processing for each pixel, and outputs three-dimensional data obtained by SAR tomography (Step S208).

After Step S208, the signal processing device 102 ends the process of FIG. 9.

Description of Effect

As described above, the optimum reflector position identifier 231 identifies optimum reflector positions which are reflector positions with a high evaluation equal to or higher than a predetermined condition as evaluated by an evaluation function, based on the reflectivity distribution vector estimated by the vector estimation device 210. The optimum reflector number identifier 232 identifies the optimum number of reflectors, which is the number of reflectors with a high evaluation equal to or higher than a predetermined condition as evaluated by an evaluation function, based on the optimum reflector positions identified by the optimum reflector position identifier 231.

According to the signal processing device 102, it is possible to evaluate reflector positions and the number of reflectors using an evaluation function, and determine a hyperparameter value based on the evaluation result. According to the signal processing device 102, in this respect, it is expected that reflector positions and the number of reflectors can be evaluated highly accurately, and a hyperparameter value that enables highly accurate array signal processing can be determined.

Third Example Embodiment

Description of Configuration

Figure 12:
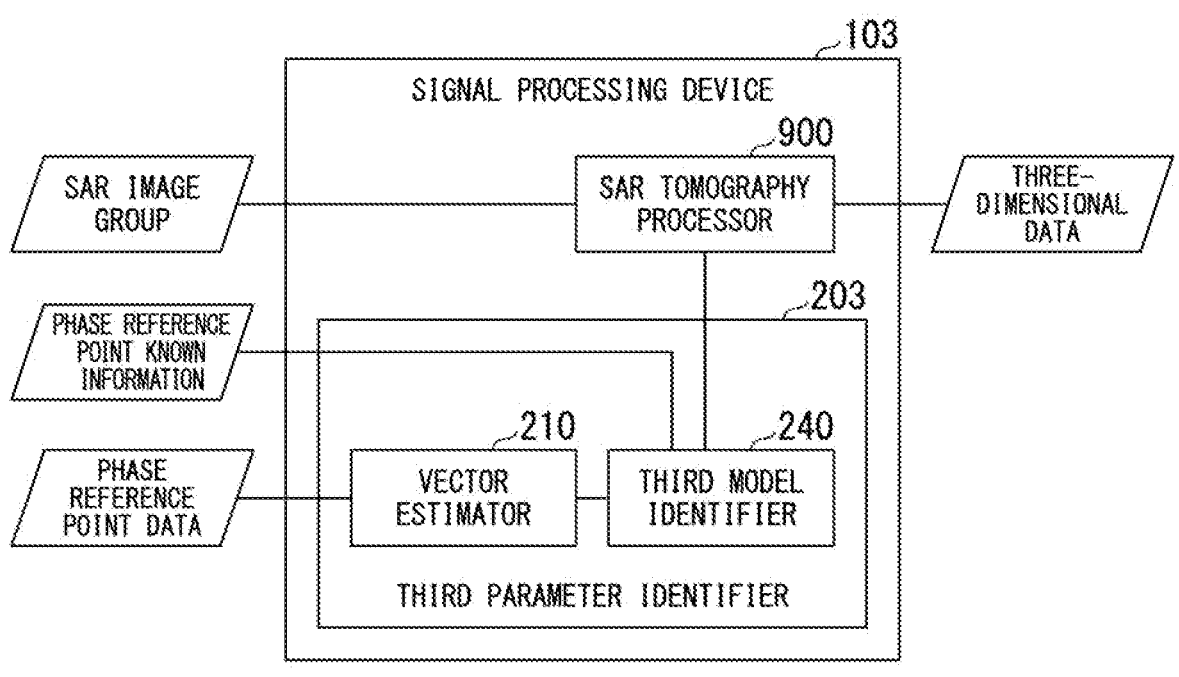
FIG. 12 is a block diagram showing a configuration example of a signal processing device according to a third example embodiment.

FIG. 12 is a block diagram showing a configuration example of a signal processing device according to a third example embodiment. In the configuration shown in FIG. 12, a signal processing device 103 includes a third parameter identifier 203 and the SAR tomography processor 900. The third parameter identifier 203 includes the vector estimator 210 and a third model identifier 240.

Since the vector estimator 210 and the SAR tomography processor 900 in FIG. 12 are the same as the vector estimator 210 and the SAR tomography processor 900 in FIG. 1, the same reference signs are assigned thereto and detailed descriptions thereof are omitted. Comparing the signal processing device 103 with the signal processing device 101 shown in FIG. 1, the parameter identifier 201 is substituted by the third parameter identifier 203. Comparing the third parameter identifier 203 with the parameter identifier 201 in FIG. 1, the model identifier 220 is substituted by the third model identifier 240.

In other respects, the signal processing device 103 is the same as the signal processing device 101.

The third parameter identifier 203 receives an input of phase reference point data and phase reference point known information, and outputs an identified appropriate hyperparameter to the SAR tomography processor 900.

The third model identifier 240 identifies a reflector position model in a reflectivity distribution estimation direction from a vector estimation result, and compares it with phase reference point known information. If it is determined that the phase reference point known information and the reflector position model in the reflectivity distribution estimation direction match, the third model identifier 240 outputs the hyperparameter value to the SAR tomography processor 900, and outputs the determination result to the vector estimator 210.

On the other hand, if it is determined that the phase reference point known information and the reflector position model in the reflectivity distribution estimation direction do not match, the third model identifier 240 outputs the determination result to the vector estimator 210. In such a case, the third model identifier 240 does not output a hyperparameter value.

Figure 13:
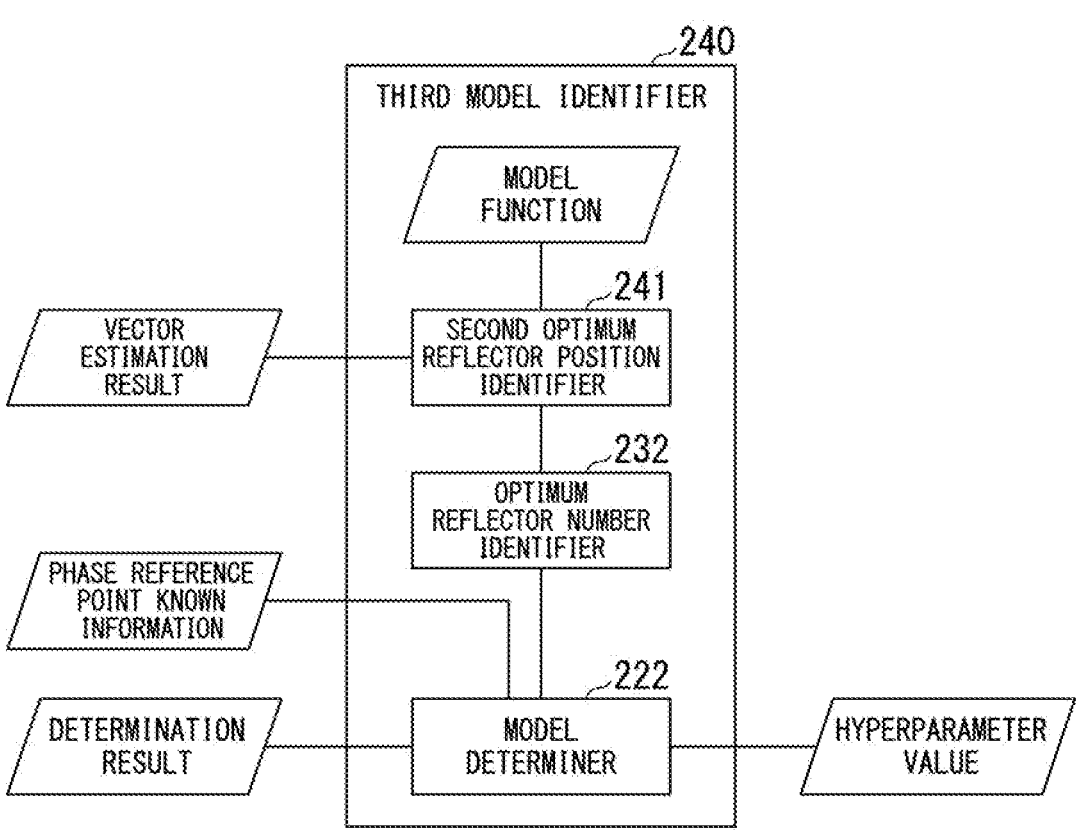
FIG. 13 is a block diagram showing a configuration example of a third model identifier according to the third example embodiment.

FIG. 13 is a block diagram showing a configuration example of the third model identifier 240. In the configuration shown in FIG. 13, the third model identifier 240 includes a second optimum reflector position identifier 241, an optimum reflector number identifier 232, and a model identifier 222.

Since the optimum reflector number identifier 232 in FIG. 13 is the same as the optimum reflector number identifier 232 in FIG. 8, the same reference sign is assigned thereto and detailed description thereof is omitted. Since the model determiner 222 in FIG. 13 is the same as the model determiner 222 in FIG. 4, the same reference sign is assigned thereto and detailed description thereof is omitted.

Comparing the third model identifier 240 with the model identifier 230 in FIG. 8, the optimum reflector position identifier 231 is substituted by the second optimum reflector position identifier 241.

In other respects, the third model identifier 240 is the same as the second model identifier 230.

The second optimum reflector position identifier 241 uses an input of a vector estimation result from the vector estimator 210 to identify optimum reflector positions by performing function fitting (curve fitting) using a given model function. Specifically, the second optimum reflector position identifier 241 approximates reflector positions estimated from the vector estimation result with a model function, and evaluates the reflector positions according to the degree of approximation.

In such a case, the combination of the model function and the function for calculating the degree of approximation corresponds to an example of the evaluation function in the second embodiment. Therefore, the reflector positions with the highest degree of approximation identified by the second optimum reflector position identifier 241 corresponds to an example of optimum reflector positions.

The second optimum reflector position identifier 241 outputs the identification result to the optimum reflector number identifier 232.

Examples of the model function used for function fitting by the second optimum reflector position identifier include, but are not limited to, any function that is continuous and differentiable over all real numbers, such as a Gaussian function or Sin c function. The model function used by the second optimum reflector position identifier for function fitting may be a function that is discontinuous or non-differentiable over a part of the domain of real numbers.

As a method for calculating the degree of approximation to approximate reflector positions by a model function, the second optimum reflector position identifier may use various methods that enable evaluation of the accuracy of approximating a point group by a line, such as the least squares method.

Description of Operation

Next, operations of the signal processing device 103 will be described.

Figure 14:
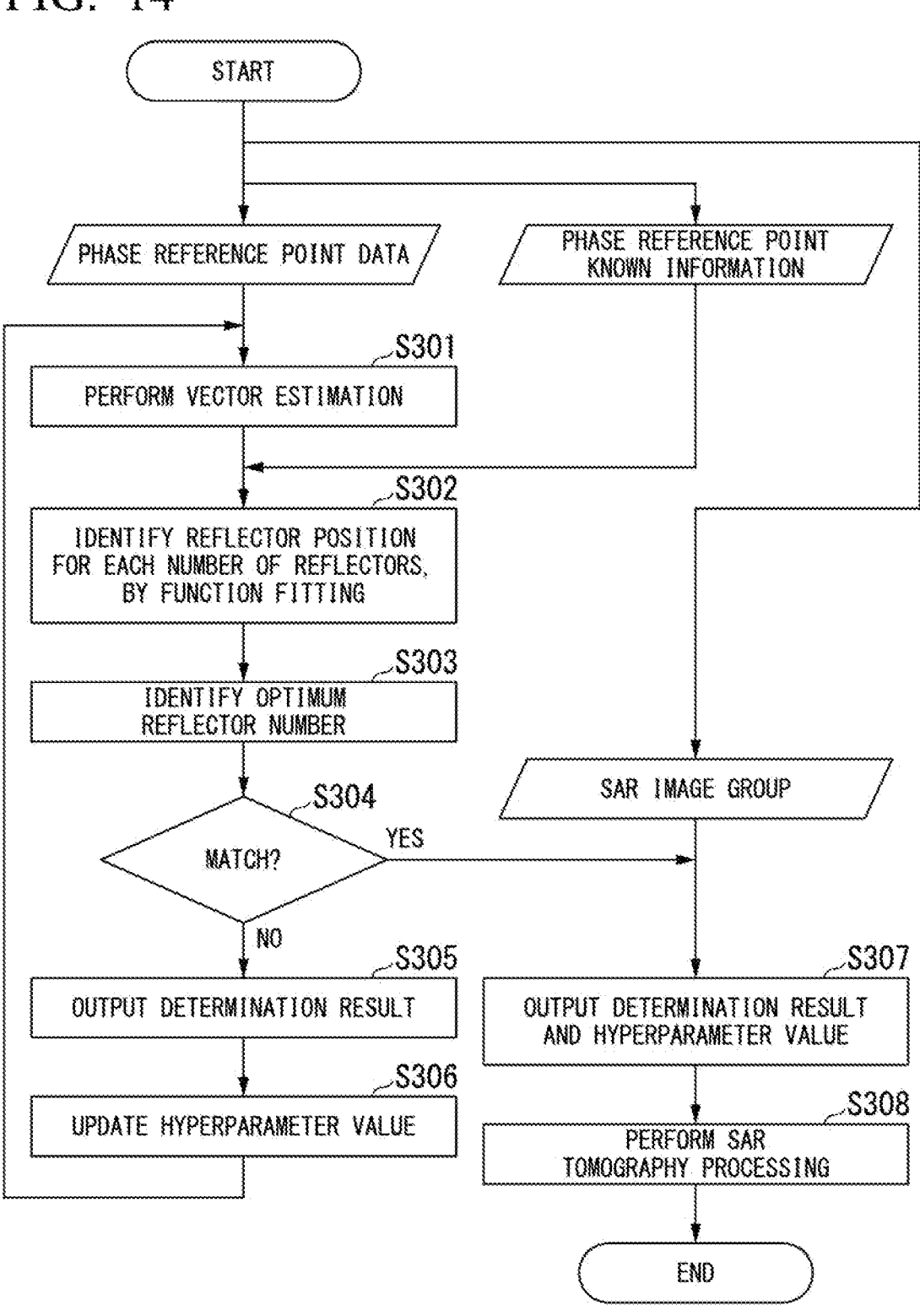
FIG. 14 is a flowchart showing an example of a procedure for the signal processing device according to the third example embodiment to perform SAR tomography three-dimensional image processing.

FIG. 14 is a flowchart showing an example of a procedure for the signal processing device 103 to perform SAR tomography three-dimensional image processing.

Comparing the process performed by the signal processing device 103 in FIG. 14 with the process performed by the signal processing device 102 in FIG. 9, the process in Step S302 differs from the process in Step S202 in FIG. 9.

The rest of the processing is the same as that in the case of FIG. 9. That is to say, the processes of Step S301 and Step S303 to Step S308 of FIG. 14 are the same as those of Step S201 and Step S203 to Step S208 of FIG. 9.

In Step S302, the second optimum reflector position identifier 241 identifies optimum reflector positions by function fitting for each assumption of the reflector number.

Figure 15:
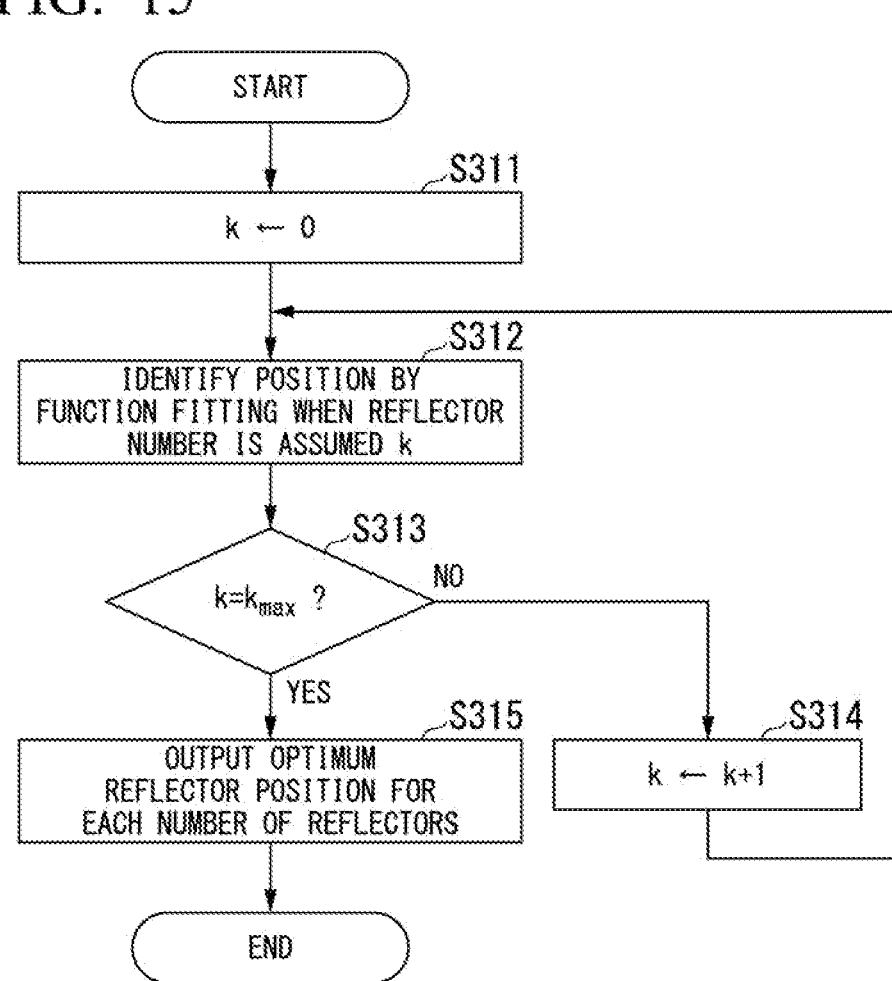
FIG. 15 is a flowchart showing an example of a processing procedure for a second optimum reflector position identifier according to the third example embodiment to identify optimum reflector positions by function fitting for each assumption of the number of reflectors.

FIG. 15 is a flowchart showing an example of a processing procedure for the second optimum reflector position identifier 241 to identify optimum reflector positions by function fitting for each assumption of the number of reflectors. The second optimum reflector position identifier 241 performs the process of FIG. 15 in Step S302 of FIG. 14.

Comparing the process performed by the second optimum reflector position identifier 241 in FIG. 15 with the process performed by the optimum reflector position identifier 231 in FIG. 10, the process in Step S312 differs from the process in Step S212 of FIG. 10.

The rest of processing is the same as that in the case of FIG. 10. That is to say, the processes of Step S311 and Step S313 to Step S315 of FIG. 15 are the same as those of Step S211 and Step S213 to Step S215 of FIG. 10.

In Step S312, the second optimum reflector position identifier 241 identifies optimum reflector positions in the case where the reflector number is assumed to be k, using function fitting.

Description of Effect

As described above, the second optimum reflector position identifier 241 identifies optimum reflector positions, which are reflector positions with a high evaluation equal to or higher than a predetermined condition, by estimating the positions of reflectors based on the reflectivity distribution vector estimated by the vector estimator 210 and by evaluating the estimated reflector positions based on the degree of approximation obtained by a model function.

According to the signal processing device 103, it is possible to evaluate reflector positions and the number of reflectors by function fitting, and determine a hyperparameter value based on the evaluation result. According to the signal processing device 103, in this respect, it is expected that reflector positions and the number of reflectors can be evaluated highly accurately, and a hyperparameter value that enables highly accurate array signal processing can be determined.

Moreover, the signal processing device 103 is expected to have a smaller computational load than the case of the signal processing device 102, by using function fitting.

Fourth Example Embodiment

Description of Configuration

Figure 16:
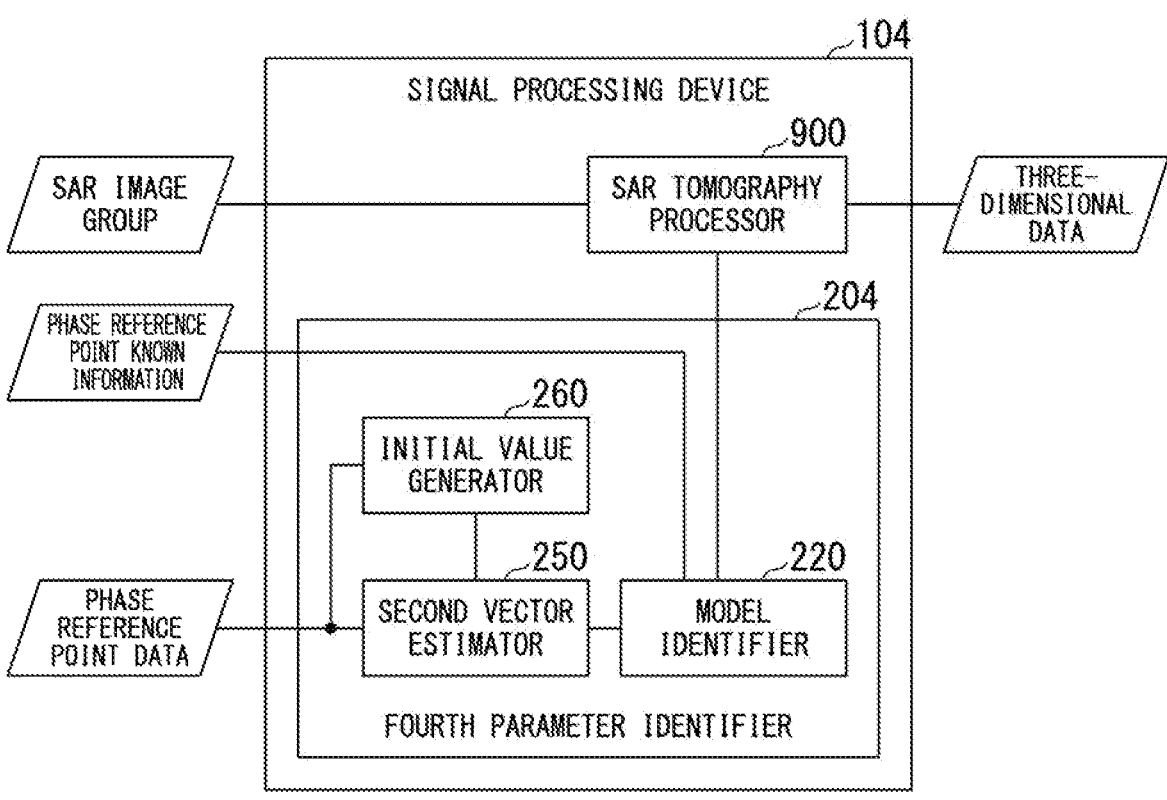
FIG. 16 is a block diagram showing a configuration example of a signal processing device according to a fourth example embodiment.

FIG. 16 is a block diagram showing a configuration example of a signal processing device according to a fourth example embodiment. In the configuration shown in FIG. 16, a signal processing device 104 includes a fourth parameter identifier 204 and a SAR tomography processor 900. The fourth parameter identifier 204 includes a second vector estimator 250, an initial value generator 260, and a model identifier 220.

Since the model identifier 220 and the SAR tomography processor 900 in FIG. 16 are the same as the model identifier 220 and the SAR tomography processor 900 in FIG. 1, the same reference signs are assigned thereto and detailed descriptions thereof are omitted. Comparing the signal processing device 104 with the signal processing device 101 shown in FIG. 1, the parameter identifier 201 is substituted by the fourth parameter identifier 204. Comparing the fourth parameter identifier 204 with the parameter identifier 201 in FIG. 1, the vector estimator 210 is substituted by the second vector estimator 260 and the initial value generator 260.

In other respects, the signal processing device 104 is the same as the signal processing device 101.

The fourth parameter identifier 204 receives an input of phase reference point data and phase reference point known information, and outputs an identified appropriate hyperparameter to the SAR tomography processor 900.

The second vector estimator 250 uses an input of an initial value vector generated by the initial value generator 260 to perform array signal processing at a phase reference point, and calculates a reflectivity distribution vector γ at the phase reference point. As has been described regarding the vector estimator 210, the second vector estimator 210 finds the reflectivity distribution vector γ in the same direction as that in the case of the SAR tomography processor 900.

Figure 17:
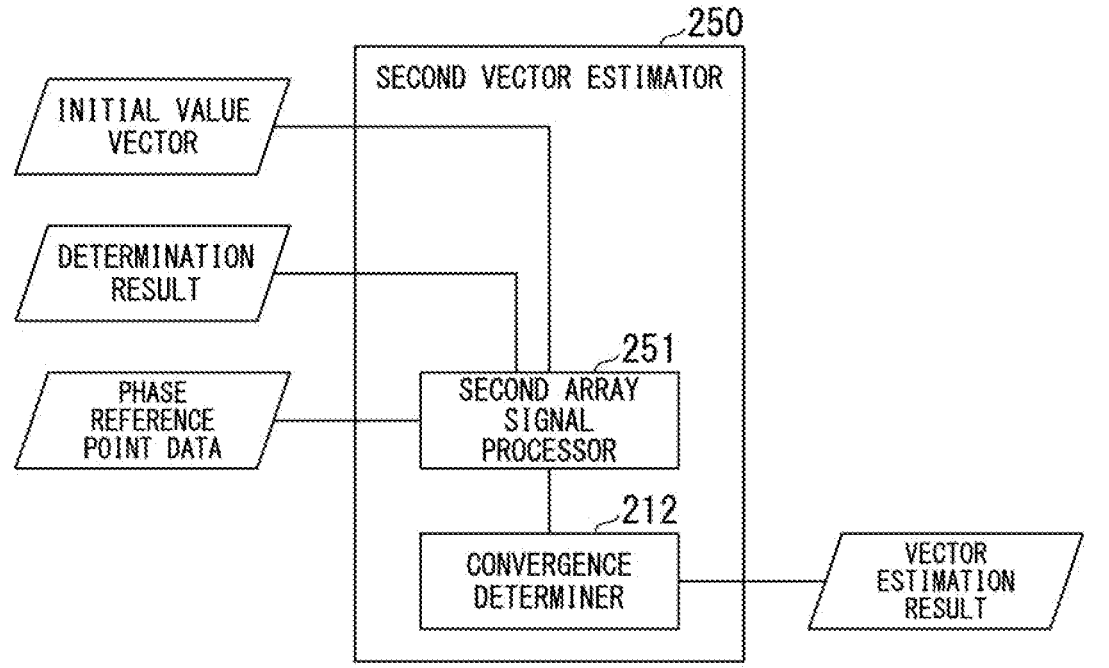
FIG. 17 is a block diagram showing a configuration example of a second vector estimator according to the fourth example embodiment.

FIG. 17 is a block diagram showing a configuration example of the second vector estimator 250. In the configuration shown in FIG. 17, the second vector estimator 250 includes a second array signal processor 251 and a convergence determiner 212.

Since the convergence determiner 212 in FIG. 17 is the same as the convergence determiner 212 in FIG. 3, the same reference sign is assigned thereto and detailed description thereof is omitted.

Comparing the second vector estimator 250 with the vector estimator 210 in FIG. 3, the array signal processor 211 is substituted by the second array signal processor 251.

In other respects, the second vector estimator 250 is the same as the vector estimator 210.

The initial value generator 260 receives an input of phase reference point data, generates an initial value vector, and outputs it to second vector estimator 250. Examples of means for generating an initial value vector include a technique using beamforming and singular value decomposition.

The initial value generator 260 generates an initial value vector that reflects, to some extent, a reflectivity distribution at a phase reference point.

The initial value generator 260 generates an initial value vector in the same direction as that in the case of the second vector estimator 250. For example, in the case where the second vector estimator 250 finds the reflectivity distribution vector γ in the elevation direction, the initial value generator 260 generates an initial value vector indicating a reflectivity distribution vector in the elevation direction. In the case where the second vector estimator 250 finds the reflectivity distribution vector γ in the direction perpendicular to the ground surface, the initial value generator 260 generates an initial value vector indicating a reflectivity distribution vector in the direction perpendicular to the ground surface.

The statement "reflecting a reflectivity distribution to some extent" means that information on the reflectivity distribution may not be obtained completely.

For example, beamforming or singular value decomposition may be used as a method for the initial value generator 260 to generate an initial value vector. Using one of these methods has an advantage of low computational cost for generating the initial value vector, however, on the other hand, the resolution in the elevation direction becomes comparatively low.

In the case where the initial value generator 260 estimates a reflectivity distribution vector using a method with low resolution in the elevation direction, it is conceivable that signals from a plurality of reflectors that are close to each other in the elevation direction are mixed and cannot be completely separated.

As in this case, while the initial value vector generated by the initial value generator 260 indicates correct information on reflectivity distribution such as reflector positions, information on reflectivity distribution may not be indicated completely.

The second array signal processor 251 uses inputs of; phase reference point data, an initial value vector from the initial value generator 260, a determination result from the model identifier 220, and a convergence determination result from the convergence determiner 212 to perform signal estimation using array signal processing at the phase reference point, and outputs the signal estimation result to the convergence determiner 212.

The fourth example embodiment may be implemented in combination with the second example embodiment or the third example embodiment. Therefore, the model identifier 220 in the fourth parameter identifier 204 may be substituted by the second model identifier 230 in the second example embodiment or the third model identifier 240 in the third example embodiment.

Description of Operation

Next, operations of the signal processing device 104 will be described.

Figure 18:
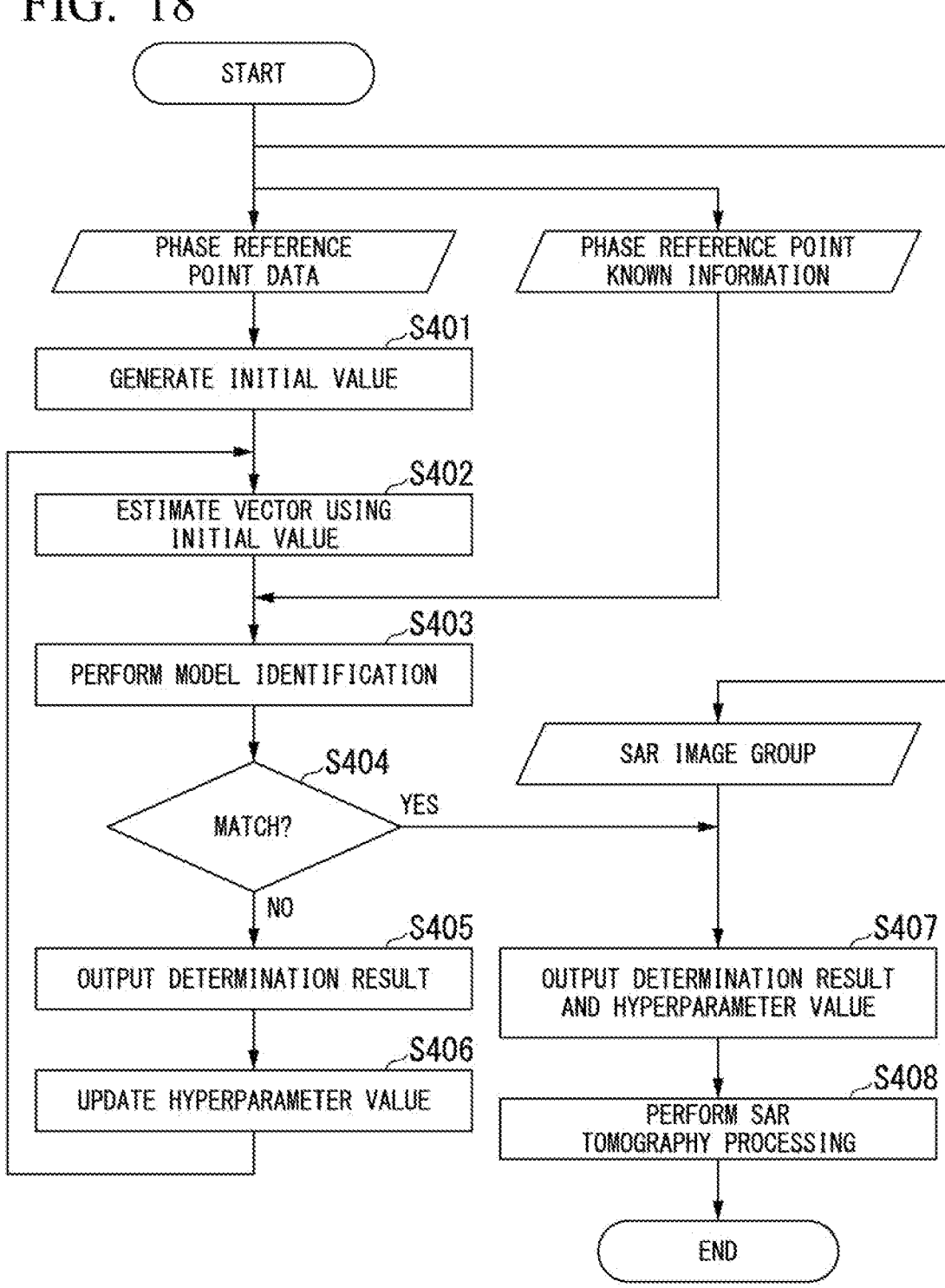
FIG. 18 is a flowchart showing an example of a procedure for the signal processing device according to the fourth example embodiment to perform SAR tomography three-dimensional image processing.

FIG. 18 is a flowchart showing an example of a procedure for the signal processing device 104 to perform SAR tomography three-dimensional image processing.

Comparing the process performed by the signal processing device 104 in FIG. 18 with the process performed by the signal processing device 101 in FIG. 5, these processes differ from each other in that the process in Step S401 is added. Also, the process in Step S402 of FIG. 18 differs from the process in Step S101 of FIG. 5.

The rest of the processing is the same as that in the case of FIG. 5. That is to say, the processes of Step S403 to Step S408 of FIG. 18 are the same as those of Step S102 to Step S107 of FIG. 5. After Step S406, the process transitions to Step S402.

In Step S401, the initial value generator 260 receives phase reference point data and generates an initial value vector using beamforming or singular value decomposition, for example.

In step S402, the second vector estimator 250 receives the phase reference point data and the initial value vector from the initial value generator 260, and estimates a reflectivity distribution vector using the initial value vector.

Figure 19:
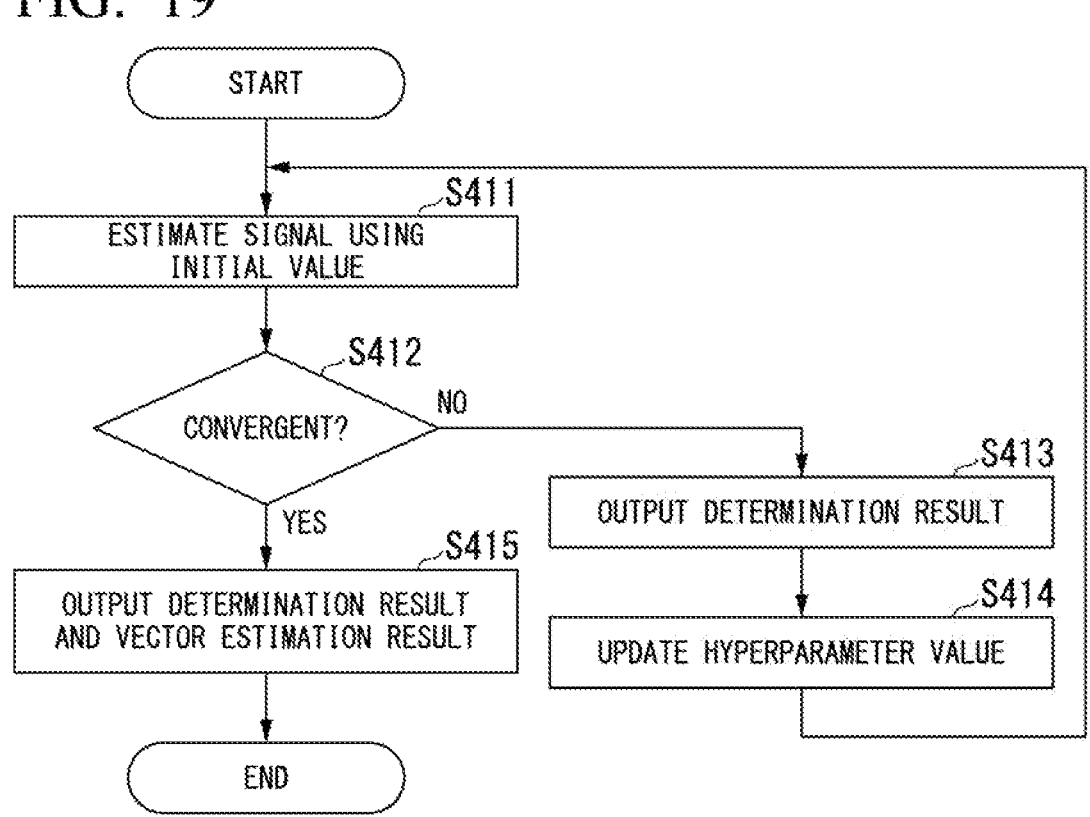
FIG. 19 is a flowchart showing an example of a processing procedure for the second vector estimator according to the fourth example embodiment to estimate a reflectivity distribution vector in an elevation direction using an initial value vector.

FIG. 19 is a flowchart showing an example of a processing procedure for the second vector estimator 250 to estimate the reflectivity distribution vector using the initial value vector.

Comparing the process performed by the second vector estimator 250 in FIG. 19 with the process performed by the vector estimator 210 in FIG. 6, the process in Step S411 differs from the process in Step S111 of FIG. 6.

The rest of processing is the same as that in the case of FIG. 6. That is to say, the processes of Step S412 to Step S415 of FIG. 19 are the same as those of Step S112 to Step S115 of FIG. 6.

In Step S411, the second array signal processor 251 performs array signal processing using the initial value vector, and outputs the reflectivity distribution vector γ as a signal estimation result to the convergence determiner 212 (Step S111).

Specifically, the second array signal processor 251 performs array signal processing at the phase reference point, using the set hyperparameter value, the phase reference point data, and the initial value of the reflectivity distribution vector (Step S111).

In the second and subsequent executions of Step S411, the second array signal processor 251 performs array signal processing at the phase reference point, using a hyperparameter value that is updated in Step S414. Also, in the second and subsequent executions of step S411, the second array signal processor 251 uses the same phase reference point data and reflectivity distribution vector initial value as those in the first execution.

In either case, the second array signal processor 251 outputs the reflectivity distribution vector γ as a signal estimation result to the convergence determiner 212.

Description of Effect

As described above, the initial value generator 260 generates an initial value vector of the reflectivity distribution vector, based on the phase reference point data obtained from reception signals at the phase reference point. The second vector estimation means estimates the reflectivity distribution vector, based on the phase reference point data and the initial value vector.

The initial value vector generated by the initial value generator 260 reflects, to some extent, the reflectivity distribution at the phase reference point. As a result, compared with the array signal processor 211 in the first example embodiment, the second array signal processor 251 is expected to repeat the array signal processing fewer times and have a faster convergence speed, thus reducing the computation time.

Fifth Example Embodiment

Figure 20:
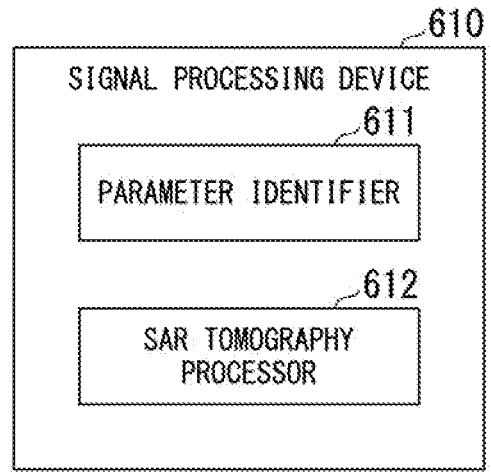
FIG. 20 is a block diagram showing a configuration example of a signal processing device according to a fifth example embodiment.

FIG. 20 is a block diagram showing a configuration example of a signal processing device according to a fifth example embodiment. In the configuration shown in FIG. 20, a signal processing device 610 includes a parameter identifier 611 and a SAR tomography processor 612.

With such a configuration, the parameter identifier 611 sets the value of a hyperparameter for array signal processing in synthetic aperture radar tomography, by using a SAR image group of a phase reference point at which phase reference point known information, which is information pertaining to reflector positions, is obtained. The SAR tomography processor 612 performs SAR tomography image processing, using the array signal processing in which the value of the hyperparameter set by the parameter identifier 611 was used.

According to the signal processing device 610, when an array signal processing algorithm in synthetic aperture radar tomography has a hyperparameter, the hyperparameter value can be set automatically.

In particular, in the signal processing device 610, it is possible, by means of the parameter identifier 611, to estimate a hyperparameter that enables reproduction of phase reference point known information, that is, an appropriate hyperparameter. An appropriate hyperparameter at a phase reference point is also expected to be an appropriate hyperparameter for other pixels.

In this respect, the signal processing device 610 is expected to be able to converge the result of array signal processing in the SAR tomography processor 612 to a globally optimum solution.

As described above, in those cases where the hyperparameter value needs to be adjusted artificially, it is conceivable that if the value is set inappropriately, the result of reflectivity distribution vector estimation may not converge and the original reflectivity distribution may not be reproduced at all. Also, if an inappropriate hyperparameter value is set, convergence may occur to a local solution, which is not the global optimum solution, and a false signal may be detected at a position different from the original reflectivity distribution. Further, it is conceivable that if an inappropriate hyperparameter value is set, a large computational cost may be required until convergence to an appropriate solution is achieved.

In contrast to this, the parameter identifier 611 evaluates the validity of a meta-parameter value using phase reference point known information, and sets a meta-parameter value evaluated as valid. In this respect, as described above, the signal processing device 610 is expected to be able to converge the result of array signal processing in the SAR tomography processor 612 to a globally optimum solution.

Sixth Example Embodiment

Figure 21:
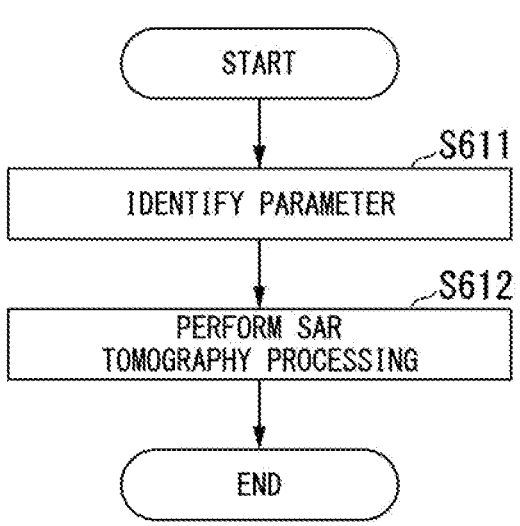
FIG. 21 is a diagram showing an example of a processing procedure in a signal processing method according to a sixth example embodiment.

FIG. 21 is a diagram showing an example of a processing procedure in a signal processing method according to a sixth example embodiment. The signal processing method shown in FIG. 21 includes a step of performing parameter identification (Step S611) and a step of performing SAR tomography processing (Step S612).

The step of performing parameter identification (Step S611) sets the value of a hyperparameter for array signal processing in synthetic aperture radar tomography, by using a SAR image group of a phase reference point at which phase reference point known information, which is information pertaining to reflector positions, is obtained.

The step of performing SAR tomography processing (Step S612) performs SAR tomography image processing, using the array signal processing in which the set value of the hyperparameter was used.

According to the signal processing method shown in FIG. 21, when an array signal processing algorithm in synthetic aperture radar tomography has a hyperparameter, the hyperparameter value can be set automatically.

In particular, in the signal processing method shown in FIG. 21, through the step of performing parameter identification (Step S611), it is possible to estimate a hyperparameter that enables reproduction of phase reference point known information, that is, an appropriate hyperparameter. An appropriate hyperparameter at a phase reference point is also expected to be an appropriate hyperparameter for other pixels.

In this respect, the signal processing method shown in FIG. 21 is expected to enable convergence of the result of array signal processing in the step of performing SAR tomography processing (Step S612) to a globally optimum solution.

As described above, in those cases where the hyperparameter value needs to be adjusted artificially, it is conceivable that if the value is set inappropriately, the result of reflectivity distribution vector estimation may not converge and the original reflectivity distribution may not be reproduced at all. Also, if an inappropriate hyperparameter value is set, convergence may occur to a local solution, which is not the global optimum solution, and a false signal may be detected at a position different from the original reflectivity distribution. Further, it is conceivable that if an inappropriate hyperparameter value is set, a large computational cost may be required until convergence to an appropriate solution is achieved.

In contrast to this, the signal processing method shown in FIG. 21 evaluates the validity of a meta-parameter value using phase reference point known information, and sets a meta-parameter value evaluated as valid. In this respect, as mentioned above, the signal processing method shown in FIG. 21 is expected to enable convergence of the result of array signal processing in the step of performing SAR tomography processing (Step S612) to a globally optimum solution.

It should be noted that each of the components in each of the above example embodiments can be configured by one piece of hardware or one piece of software. Also, each of the components can be configured by a plurality of pieces of hardware or a plurality of pieces of software. Moreover, some of those components may be configured by hardware and other components may be configured by software.

Each function (each process) in each of the above example embodiments can be realized by a computer having a processor such as a CPU (Central Processing Unit), a memory, and so forth. For example, in the case where a program for executing each method (each process) in each example embodiment is stored in a storage device (storage medium), each function is realized by the CPU executing the program stored in the storage device. Also, SAR image groups that have undergone interferometric processing may be stored in the memory storage device.

Any of the example embodiments may be applied to applications such as acquisition of three-dimensional data of ground structures and the like by means of SAR tomography with synthetic aperture radar using platforms such as an artificial satellite and an aircraft.

Figure 22:
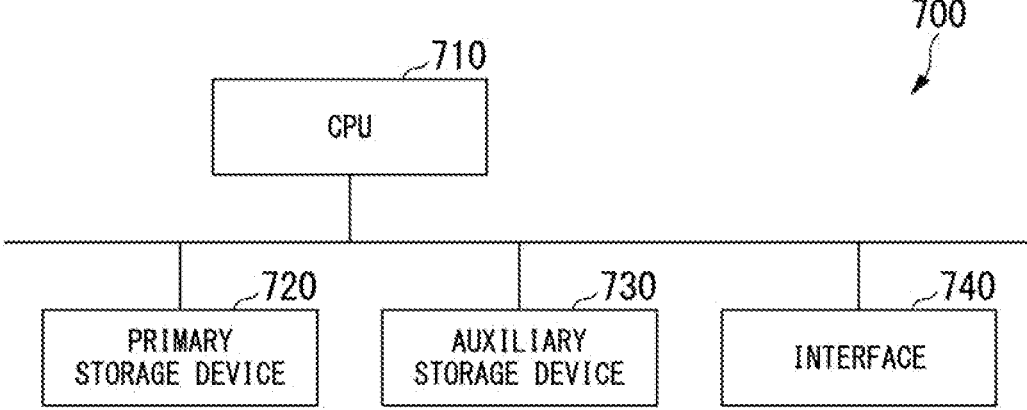
FIG. 22 is a schematic block diagram showing a configuration of a computer according to at least one of the example embodiments.

FIG. 22 is a schematic block diagram showing a configuration of a computer according to at least one of the example embodiments.

In the configuration shown in FIG. 22, a computer 700 includes a CPU 710, a main memory storage device 720, an auxiliary memory storage device 730, and an interface 740.

One or more of the signal processing devices 101 to 104, and 610 may be implemented in the computer 700. In such a case, operations of the respective processors described above are stored in the auxiliary storage device 730 in the form of a program. The CPU 710 reads out the program from the auxiliary storage device 730, loads it on the primary storage device 720, and executes the processing described above according to the program. Moreover, the CPU 710 secures in the main memory storage device 720 a memory storage region to be used for processes. Communication between each device and other devices is executed by the interface 740 having a communication function and communicating according to the control of the CPU 710.

In the case where the signal processing device 101 is implemented in the computer 700, operations of the parameter identifier 201 and the SAR tomography processor 900 and operations of each component thereof are stored in the auxiliary memory storage device 730 in the form of a program. The CPU 710 reads out the program from the auxiliary storage device 730, loads it on the primary storage device 720, and executes the processing described above according to the program.

Moreover, the CPU 710 secures in the main memory storage device 720 a memory storage region to be used by the signal processing device 101.

In the case where the signal processing device 102 is implemented in the computer 700, operations of the second parameter identifier 202 and the SAR tomography processor 900 and operations of each component thereof are stored in the auxiliary memory storage device 730 in the form of a program. The CPU 710 reads out the program from the auxiliary storage device 730, loads it on the primary storage device 720, and executes the processing described above according to the program.

Moreover, the CPU 710 secures in the main memory storage device 720 a memory storage region to be used by the signal processing device 102.

In the case where the signal processing device 103 is implemented in the computer 700, operations of the third parameter identifier 203 and the SAR tomography processor 900 and operations of each component thereof are stored in the auxiliary memory storage device 730 in the form of a program. The CPU 710 reads out the program from the auxiliary storage device 730, loads it on the primary storage device 720, and executes the processing described above according to the program.

Moreover, the CPU 710 secures in the main memory storage device 720 a memory storage region to be used by the signal processing device 103.

In the case where the signal processing device 104 is implemented in the computer 700, operations of the fourth parameter identifier 204 and the SAR tomography processor 900 and operations of each component thereof are stored in the auxiliary memory storage device 730 in the form of a program. The CPU 710 reads out the program from the auxiliary storage device 730, loads it on the primary storage device 720, and executes the processing described above according to the program.

Moreover, the CPU 710 secures in the main memory storage device 720 a memory storage region to be used by the signal processing device 104.

In the case where the signal processing device 610 is implemented in the computer 700, operations of the parameter identifier 611 and the SAR tomography processor 612 are stored in the auxiliary memory storage device 730 in the form of a program. The CPU 710 reads out the program from the auxiliary storage device 730, loads it on the primary storage device 720, and executes the processing described above according to the program.

Moreover, the CPU 710 secures in the main memory storage device 720 a memory storage region to be used by the signal processing device 610.

It should be noted that a program for executing some or all of the processes performed by the signal processing devices 101 to 104, and 610 may be recorded on a computer-readable recording medium, and the program recorded on the recording medium may be read into and executed on a computer system, to thereby perform the processing of each unit. The "computer system" referred to here includes an operating system and hardware such as peripheral devices.

Moreover, the "computer-readable recording medium" referred to here refers to a portable medium such as a flexible disk, a magnetic optical disk, a ROM (Read Only Memory), and a CD-ROM (Compact Disc Read Only Memory), or a memory storage device such as a hard disk built in a computer system. The above program may be a program for realizing a part of the functions described above, and may be a program capable of realizing the functions described above in combination with a program already recorded in a computer system.

It should be noted that each synthetic aperture radar analysis means may be realized by hardware. For example, the signal processing device 101 may be configured by implementing a circuit including hardware components such as LSI (Large Scale Integration) in which a program for realizing functions as shown in FIG. 1 is installed.

Also, some or all of the components may be realized by a general-purpose circuit (circuitry), a dedicated circuit, a processor or the like, or a combination thereof. These components may be configured with a single chip, or may be configured with a plurality of chips connected via buses. Some or all of the components may be realized by a combination of the circuit mentioned above and a program.

When some or all of the components are realized by a plurality of information processing devices, circuits, and the like, the plurality of information processing devices, circuits, and the like may be arranged in a centralized manner or in a distributed manner. For example, the information processing device, circuits, and the like may be implemented as a client-and-server system, a cloud computing system, or the like, each of which is connected via a communication network.

The example embodiments of the present invention have been described in detail with reference to the drawings. However, the specific configuration of the invention is not limited to the example embodiments, and may include designs and so forth that do not depart from the scope of the present invention.

INDUSTRIAL APPLICABILITY

The example embodiments of the present invention may be applied to a signal processing device, a signal processing method, and a recording medium.

REFERENCE SIGNS LIST

101, 102, 103, 104, 610 Signal processing device
201, 611 Parameter identifier
202 Second parameter identifier
203 Third parameter identifier
204 Fourth parameter identifier
210 Vector estimator
211 Array signal processor
212 Convergence determiner
220 Model identifier
221 Reflector position designator
222 Model determiner
230 Second model identifier
231 Optimum reflector position identifier
232 Optimum reflector number identifier
240 Third model identifier
241 Second optimum reflector position identifier
250 Second vector estimator
251 Second array signal processor
260 Initial value generator
612, 900 SAR tomography processor

What is claimed is:

1. A signal processing device comprising:
a memory configured to store instructions; and
a processor configured to execute the instructions to:
    set a value of a hyperparameter for array signal processing in synthetic aperture radar tomography, by using a SAR image group of a phase reference point at which phase reference point known information, which is information pertaining to a position of a reflector, is obtained;
    perform SAR tomography image processing, using the array signal processing in which the value of the set hyperparameter was used;
    estimate a reflectivity distribution vector indicating a distribution of estimated positions of the reflectors at the phase reference point, based on phase reference point data obtained from the SAR image group at the phase reference point; and identify a reflector position model indicating positions and number of the reflectors at the phase reference point, based on the phase reference point known information and the estimated reflectivity distribution vector; and output the positions of the reflectors.

2. The signal processing device according to claim 1, wherein the processor is configured to further execute the instructions to:

generate an initial value vector of the reflectivity distribution vector, based on the phase reference point data; and estimate the reflectivity distribution vector, based on the phase reference point data and the initial value vector.

3. The signal processing device according to claim 1, wherein the processor is configured to further execute the instructions to:

designate reflector positions, based on the estimated reflectivity distribution vector; and evaluate the validity of the designated reflector positions by comparing the designated reflector positions and the reflector positions obtained from the phase reference point known information.

4. The signal processing device according to claim 1, wherein the processor is configured to further execute the instructions to:

identify optimum reflector positions, which are reflector positions with a high evaluation equal to or higher than a predetermined condition as evaluated by an evaluation function, based on the estimated reflectivity distribution vector; and identify an optimum number of reflectors, which is the number of reflectors with a high evaluation equal to or higher than a predetermined condition as evaluated by an evaluation function, based on the identified optimum reflector positions.

5. The signal processing device according to claim 1, wherein the processor is configured to further execute the instructions to:

identify optimum reflector positions, which are reflector positions with a high evaluation equal to or higher than a predetermined condition, by estimating the positions of the reflectors based on the estimated reflectivity distribution vector, and by evaluating the estimated positions of the reflectors based on the degree of approximation obtained by a model function.

6. A signal processing method comprising:

setting the value of a hyperparameter for array signal processing in synthetic aperture radar tomography, by using a SAR image group of a phase reference point at which phase reference point known information, which is information pertaining to a position of a reflector, is obtained;

performing SAR tomography image processing, using the array signal processing in which the set value of the hyperparameter was used;

estimating a reflectivity distribution vector indicating a distribution of estimated positions of the reflectors at the phase reference point, based on phase reference point data obtained from the SAR image group at the phase reference point;

identifying a reflector position model indicating positions and number of the reflectors at the phase reference point, based on the phase reference point known information and the estimated reflectivity distribution vector; and outputting the positions of the reflectors.

7. A non-transitory computer-readable recording medium having recorded therein a program causing a computer to execute:

setting the value of a hyperparameter for array signal processing in synthetic aperture radar tomography, by using a SAR image group of a phase reference point at which phase reference point known information, which is information pertaining to a position of a reflector, is obtained;

performing SAR tomography image processing, using the array signal processing in which the set value of the hyperparameter was used;

estimating a reflectivity distribution vector indicating a distribution of estimated positions of the reflectors at the phase reference point, based on phase reference point data obtained from the SAR image group at the phase reference point;

identifying a reflector position model indicating positions and number of the reflectors at the phase reference point, based on the phase reference point known information and the estimated reflectivity distribution vector; and outputting the positions of the reflectors.

* * * * *